US012700760B2

(12) United States Patent
Ohzu et al.

(10) Patent No.: US 12,700,760 B2
(45) Date of Patent: Aug. 4, 2026

(54) ROTATING ELECTRIC MACHINE

(71) Applicant: Honda Motor Co., Ltd., Tokyo (JP)

(72) Inventors: Tatsuya Ohzu, Tokyo (JP); Shoi Yamanaka, Tokyo (JP); Tadashi Yamaguchi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 135 days.

(21) Appl. No.: 18/758,200

(22) Filed: Jun. 28, 2024

(65) Prior Publication Data

US 2025/0015650 A1 Jan. 9, 2025

(30) Foreign Application Priority Data

Jul. 5, 2023 (JP) ................................. 2023-110506

(51) Int. Cl.
*H02K 1/20* (2006.01)
*H02K 1/16* (2006.01)
*H02K 9/19* (2006.01)

(52) U.S. Cl.
CPC ................. H02K 1/20 (2013.01); H02K 1/16 (2013.01); H02K 9/19 (2013.01)

(58) Field of Classification Search
CPC ............... H02K 1/20; H02K 1/16; H02K 9/19
USPC ......................................................... 310/59
See application file for complete search history.

(56) References Cited

U.S. PATENT DOCUMENTS

| | | | | |
|---|---|---|---|---|
| 8,395,287 | B2 * | 3/2013 | Bradfield | H02K 1/20 310/58 |
| 12,212,216 | B2 * | 1/2025 | Ahn | H02K 5/203 |
| 2015/0372566 | A1 | 12/2015 | Airoldi et al. | |
| 2016/0087509 | A1 * | 3/2016 | Rippel | H02K 15/14 310/59 |
| 2023/0327503 | A1 * | 10/2023 | Lee | H02K 9/19 |

FOREIGN PATENT DOCUMENTS

| | | |
|---|---|---|
| JP | S5950546 A | 3/1984 |
| JP | 59056832 A | 4/1984 |
| JP | 2009261181 A | 11/2009 |

(Continued)

OTHER PUBLICATIONS

Japanese Office action; Application 2023110506; 8 pages; May 27, 2025.

(Continued)

*Primary Examiner* — Ahmed Elnakib
(74) *Attorney, Agent, or Firm* — Duft & Bornsen, PC

(57) ABSTRACT

A rotating electric machine including a rotor and a stator. The stator includes a stator core having a first and second core blocks arranged adjacent to each other and coils disposed in slots. Each of the first and second core blocks is configured so that first flow paths and second flow pats penetrating the first and second core blocks are provided in circumferential direction, each of the first flow paths and each of the second flow paths are arranged alternately every predetermined angle in the circumferential direction, and the first and second core blocks are arranged so that the first flow paths of the first core block and the second flow paths of the second core block communicate with each other and the second flow paths of the first core block and the first flow paths of the second core block communicate with each other.

14 Claims, 34 Drawing Sheets

(56)          References Cited

FOREIGN PATENT DOCUMENTS

| JP | 2013162608 A | 8/2013 |
| JP | 2015115994 A | 6/2015 |
| JP | 2016129447 A | 7/2016 |

OTHER PUBLICATIONS

Japanese office action; Application 2025-115574; 6 pages; Mar. 31, 2026.
Japanese office action; Application 2025-115574; 4 pages; Jun. 23, 2026.

* cited by examiner

ROTATING ELECTRIC MACHINE

CROSS-REFERENCE TO RELATED APPLICATION

This application is based upon and claims the benefit of priority from Japanese Patent Application No. 2023-110506 filed on Jul. 5, 2023, the content of which is incorporated herein by reference.

BACKGROUND OF THE INVENTION

Field of the Invention

This invention relates to a rotating electric machine.

Description of the Related Art

Conventionally, there has been known a technology for cooling the stator coil by dripping cooling medium from above the stator core. Such technology is described, for example, in Japanese Unexamined Patent Publication No. 2015-115994 (JP2015-115994A). In JP2015-115994A, a plurality of cooling medium guide vanes extending in the axial direction are provided on the outer peripheral surface of the stator core, and the cooling medium that is dripped onto the outer peripheral surface of the stator core and flows down along the outer peripheral surface flows in the axial direction of the stator by the plurality of refrigerant guide vanes to be led to the coil end part.

However, the technology described in JP2015-115994A involves cooling by dripping the cooling medium onto the outer peripheral surface of the stator. Therefore, it is difficult to sufficiently ensure cooling performance of the coil.

SUMMARY OF THE INVENTION

An aspect of the present invention is a rotating electric machine including a rotor, and a stator provided with a plurality of slots in a circumferential direction. The stator includes a stator core having a first core block and a second core block arranged adjacent to each other in an axial direction, and a coil disposed in the plurality of slots. Each of the first core block and the second core block is configured so that a plurality of first flow paths and a plurality of second flow paths penetrating the each of the first core block and the second core block in an axial direction are provided in the circumferential direction, each of the plurality of first flow paths and each of the plurality of second flow paths are arranged alternately at every a predetermined angle in the circumferential direction, and the first core block and the second core block are arranged so that the plurality of first flow paths of the first core block and the plurality of second flow paths of the second core block communicate with each other and the plurality of second flow paths of the first core block and the plurality of first flow paths of the second core block communicate with each other.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

First Embodiment

Figure 1:
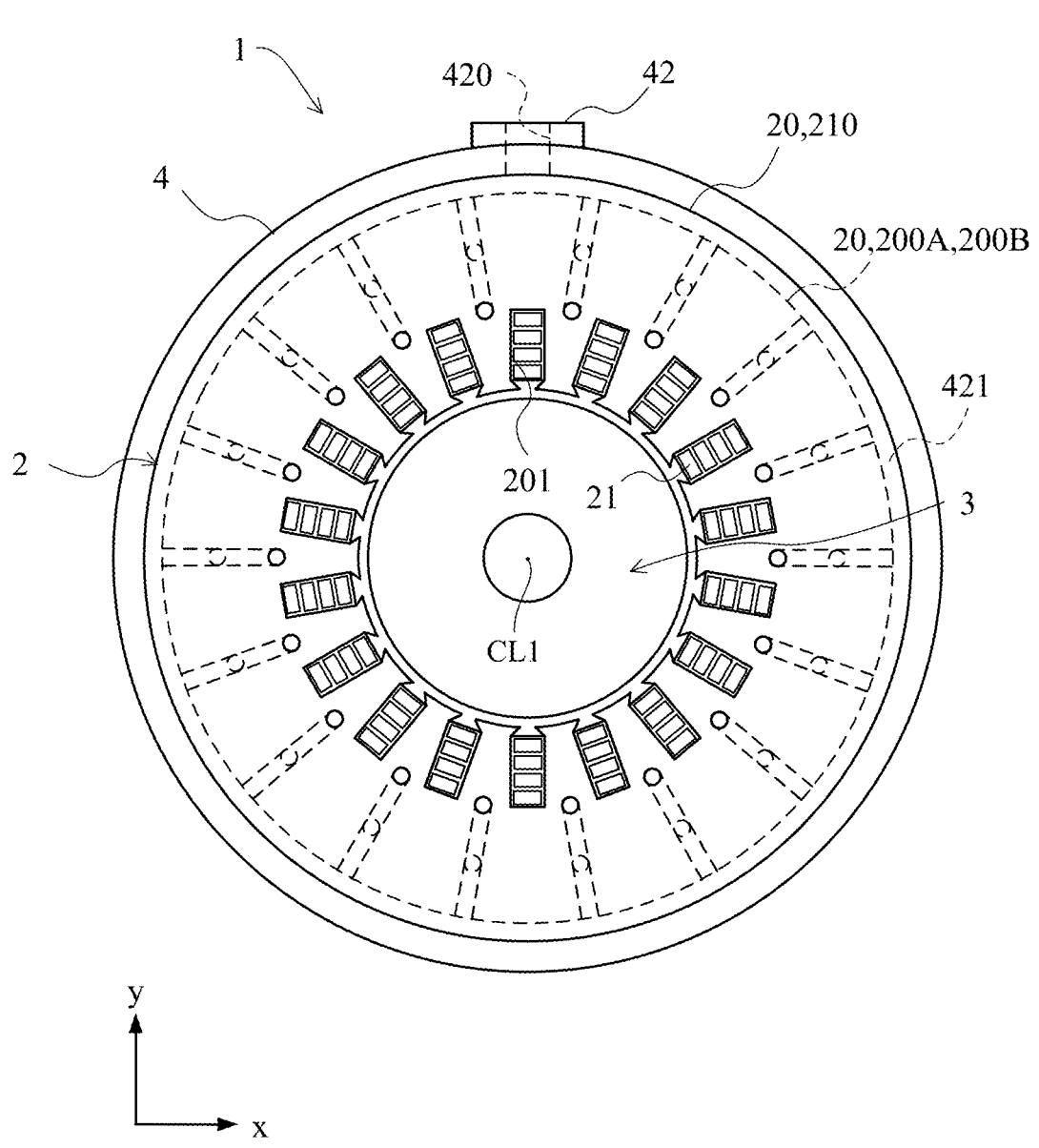
FIG. 1 is a front view showing a main configuration of a rotating electric machine according to a first embodiment of the present invention.
Figure 2:
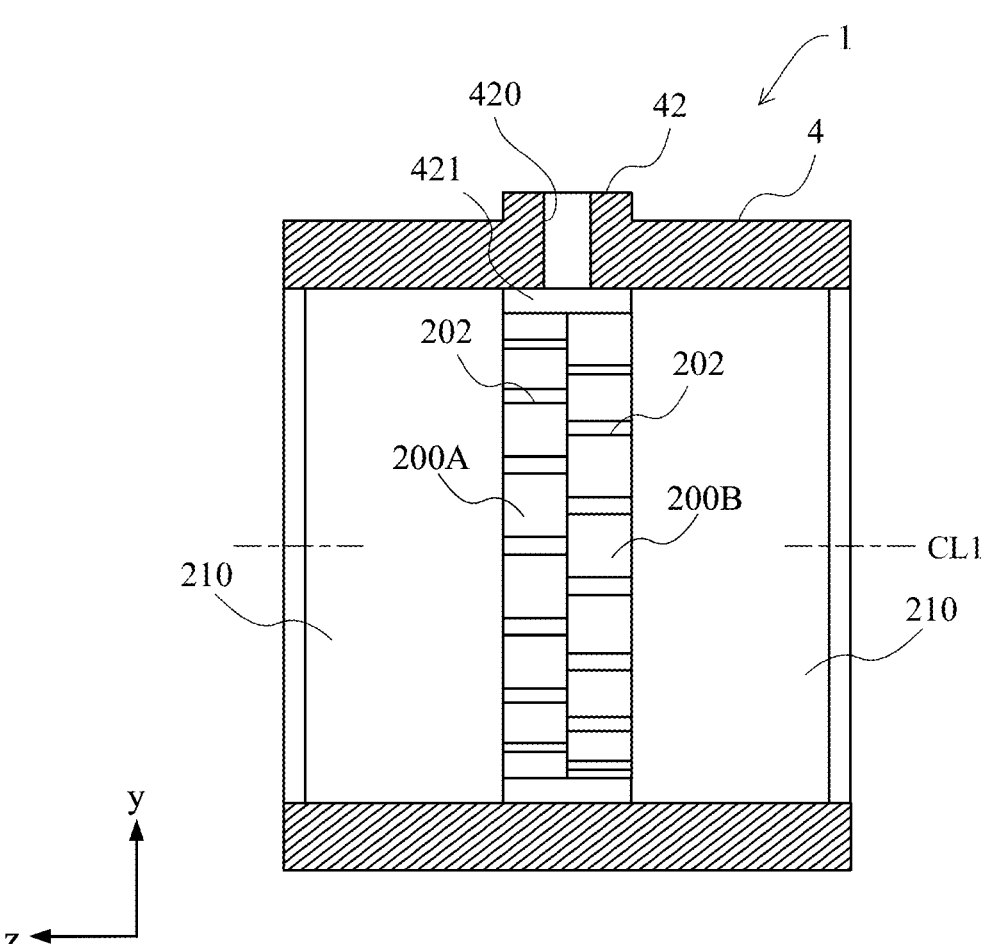
FIG. 2 is a side view showing a main configuration of a rotating electric machine according to the first embodiment of the present invention.

Below, a first embodiment of the present invention will be described with reference to FIGS. 1 to 16. FIG. 1 is a front view showing a main configuration of a rotating electric machine 1 according to the first embodiment of the present invention, and FIG. 2 is a side view showing the main configuration of the rotating electric machine 1. Below, three axes intersecting each other as shown in FIGS. 1 and 2 are defined as X-axis, Y-axis, and Z-axis, and the configuration of each part is described using these X-axis, Y-axis, and Z-axis. The Z-axis corresponds to an axial direction along a center line (axial line CL1) of the rotating electric machine 1. The Y-axis corresponds to the direction of gravity. The direction radiating from the axial line CL1 is a radial direction, and the direction along a circle centered on the axial line CL1 is a circumferential direction.

As shown in FIG. 1, the rotating electric machine 1 includes a case 4, a stator 2 arranged inside the case 4 and formed in a substantially annular shape around the axial line CL1, and a rotor 3 arranged radially inside the stator 2. The stator 2 includes a stator core 20 configured by a plurality of magnetic steel plates stacked in the axial direction, and a stator coil 21 housed in a plurality of circumferential slots 201 provided on the inner peripheral surface of the stator core 20. At the top of the case 4, a cooling medium inlet portion 42 for introducing a cooling medium into the case is provided. In the cooling medium inlet portion 42, a through hole 420 penetrating the case 4 in the Y direction is formed. The coil conductor used for the stator coil 21 is, for example, a rectangular wire with a rectangular cross-section. The coil conductor is not limited to the rectangular wire, and may be a round wire with a circular cross-section.

FIG. 2 shows the cross-sectional shape of the case 4 and the shape of the outer peripheral surface of the stator core 20. As shown in FIG. 2, the stator core 20 has four core blocks 200A, 200B, 210 and 210 stacked in the axial direction. The four core blocks are arranged in the order of core block 210, core block 200A, core block 200B, and core block 210. The core blocks 200A, 200B and 210 are all formed by stacking multiple magnetic steel plates in the axial direction. Between the inner peripheral surface of the case 4 and the outer peripheral surfaces of core blocks 200A and 200B, a cooling medium flow path 421 with a substantially annular shape centered around the axial line CL1 is formed. The through hole 420 of the cooling medium inlet portion 42 communicates with the cooling medium flow path 421.

Figure 3:
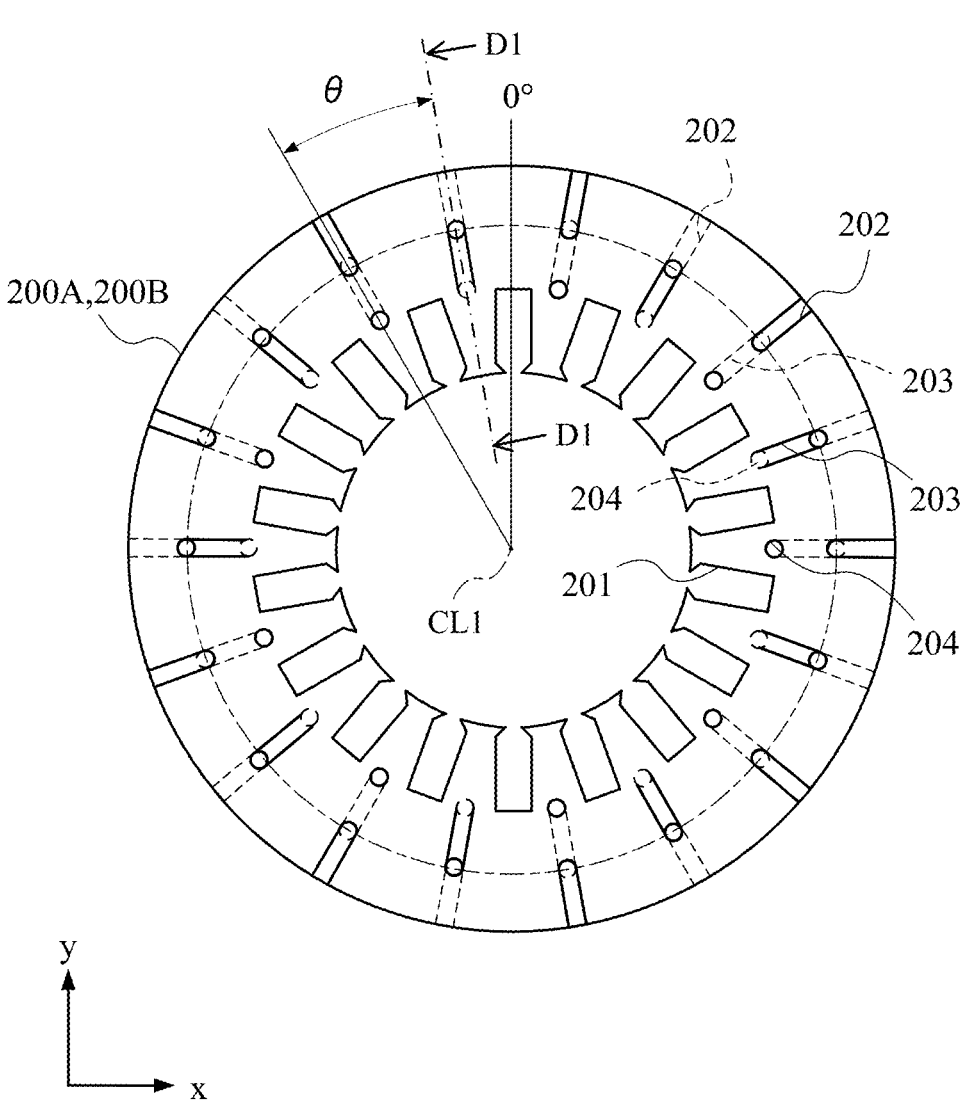
FIG. 3 is a front view of a stacked body of a pair of core blocks included in the rotating electric machine of FIG. 1.

FIG. 3 is a front view of a stacked body of the core blocks 200A and 200B. In FIG. 3, the core block 200A is placed on one side of the Z-axis, and the core block 200B is placed on the other side of the Z-axis. The core block 200A and the core block 200B have the same shape. That is, the core block 200A and the core block 200B are formed by stacking the magnetic steel plates of the same shape. As described later, the core block 200B is rotated (repositioned) in a clockwise direction by a predetermined angle θ (see FIG. 5) around the axial line CL1 relative to the core block 200A and positioned. The slots 201 are arranged in the circumferential direction at every predetermined angle θ, that is, at a predetermined slot pitch.

In the core blocks 200A and 200B, three types of cooling medium flow paths 202, 203 and 204 are formed. The cooling medium flow paths 202 to 204 indicated by solid lines are formed in the core block 200A, and those indicated by dashed lines are formed in the core block 200B.

Figure 4:
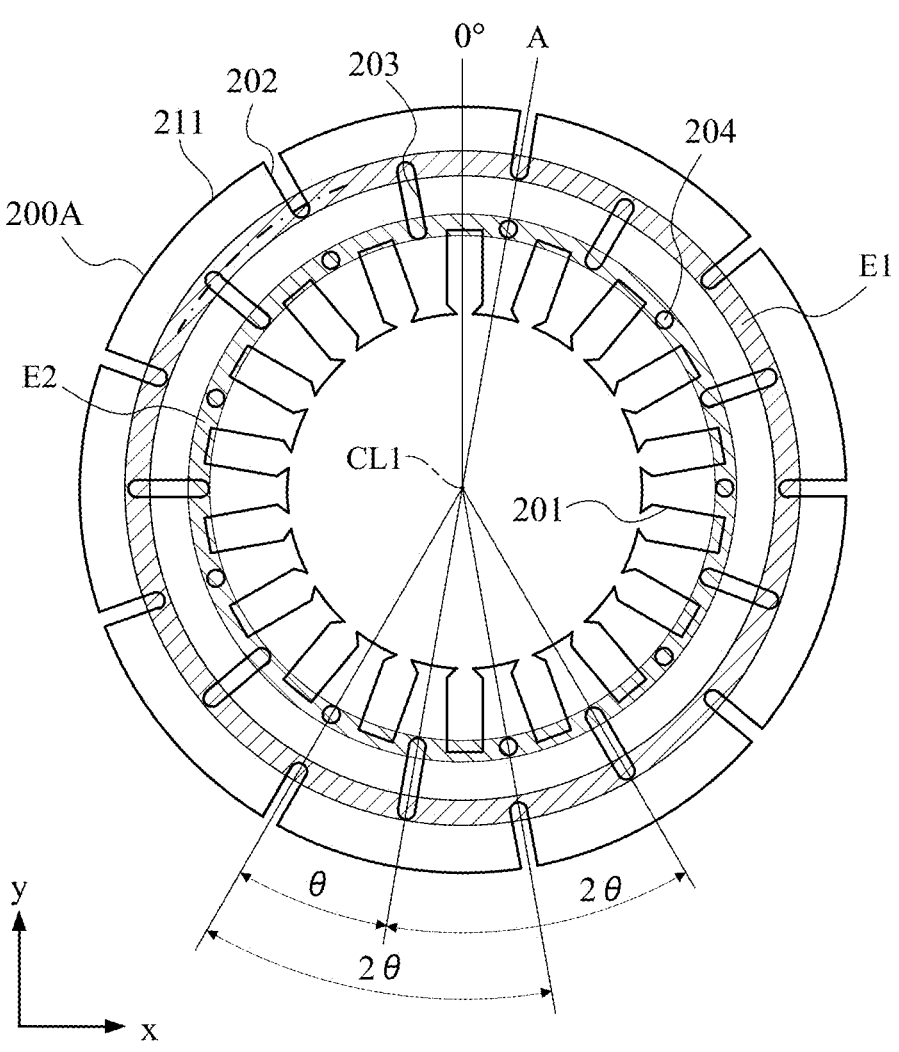
FIG. 4 is a front view of one core block in FIG. 3.

FIG. 4 is a front view of the core block 200A in FIG. 3. As described above, multiple cooling medium flow paths 202, multiple cooling medium flow paths 203, and multiple cooling medium flow paths 204 are formed in the core block 200A. The cooling medium flow path 202 extends radially from the outer peripheral surface 211 of the core block 200A, with an opening provided in the outer peripheral surface 211. The radially inner end portion of the cooling medium flow path 202 extends to a region E1 set in an annular shape around the axial line CL1. The cooling medium flow path 203 extends radially from the region E1 to a region E2 set in an annular shape around the axial line CL1, near the slot 201 on its radially inner side. The cooling medium flow paths 202 and 203 are provided to penetrate the core block 200A in the axial direction. The cooling medium flow path 204 positioned in the region E2 extends in the axial direction and penetrates the core block 200A.

In the example shown in FIG. 4, the cooling medium flow paths 202 and 203 are alternately arranged in the circumferential direction over the entire circumference of the core block 200A at every predetermined angle θ, that is, at the same pitch angle θ as the slot pitch. Each of the cooling medium flow paths 202 and 203 is arranged in the circumferential direction at every predetermined angle 2θ. The cooling medium flow path 204 is arranged in the circumferential direction at every predetermined angle 2θ. The circumferential positions of the multiple cooling medium flow paths 204 are the same as those of the multiple cooling medium flow paths 202.

Figure 5:
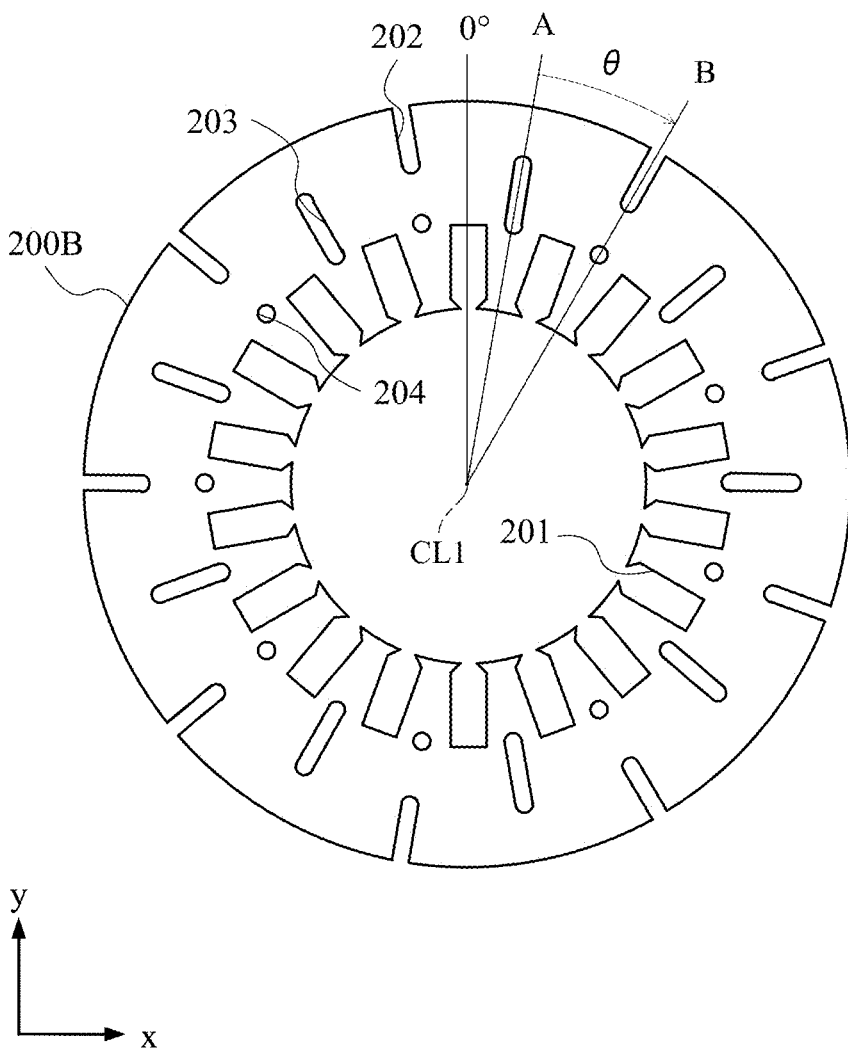
FIG. 5 is a front view of the other core block in FIG. 3.

FIG. 5 is a front view of the core block 200B in FIG. 3. As shown in FIG. 5, the shape of the core block 200B is completely identical to the shape of the core block 200A in FIG. 4. However, the arrangement in the circumferential direction differs between the core block 200A and the core block 200B. That is, the core block 200B is arranged so that the positions of the multiple cooling medium flow paths 202 of the core block 200B are shifted by the predetermined angle θ in the clockwise direction compared to those of the core block 200A. Therefore, for example, the cooling medium flow path 202 at position A in FIG. 4 becomes the cooling medium flow path 202 at position B in FIG. 5. When stacking the core block 200B on the core block 200A, the core block 200B is rotated by the predetermined angle θ in the circumferential direction relative to the core block 200A so that the 0° position in FIG. 4 matches the 0° position in FIG. 5.

As shown in FIG. 3, when the core block 200A and the core block 200B are stacked, the radially inner end portion of the cooling medium flow path 202 of the core block 200A and the radially outer end portion of the cooling medium flow path 203 of the core block 200B face each other in the axial direction. As a result, the cooling medium flow path 202 of the core block 200A communicates with the cooling medium flow path 203 of the core block 200B. Also, the radially inner end portion of the cooling medium flow path 202 of the core block 200B and the radially outer end portion of the cooling medium flow path 203 of the core block 200A face each other in the axial direction, and the cooling medium flow paths 202 and 203 communicate.

At this time, the radially inner end portion of the cooling medium flow path 203 of the core block 200A faces the cooling medium flow path 204 of the core block 200B in the axial direction. Also, the radially inner end portion of the cooling medium flow path 203 of the core block 200B faces the cooling medium flow path 204 of the core block 200A in the axial direction. As a result, the cooling medium flow path 203 of the core block 200A communicates with the cooling medium flow path 204 of the core block 200B, and the cooling medium flow path 203 of the core block 200B communicates with the cooling medium flow path 204 of the core block 200A.

Figure 6:
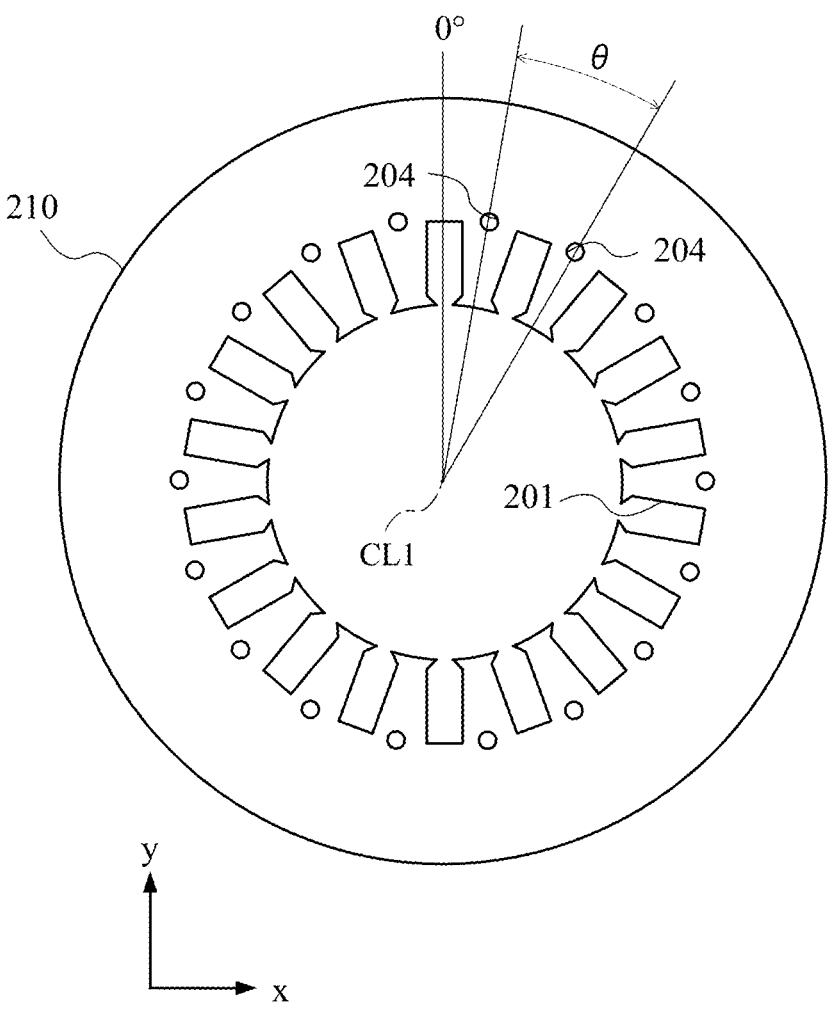
FIG. 6 is a front view of a core block disposed at an end in an axial direction of a stator core included in the rotating electric machine in FIG. 1.

FIG. 6 is a front view of the core block 210 in FIG. 2, which is located at end of the stator core 20 in the axial direction. As shown in FIGS. 1 and 2, the outer diameter of the core block 210 is larger than that of the core blocks 200A and 200B. The core block 210 is fitted and fixed to the inner peripheral surface of the case 4. As shown in FIG. 6, in the core block 210, the cooling medium flow path 204 is formed at the same position in the radial and circumferential direction as the cooling medium flow paths 204 of the core blocks 200A and 200B adjacent to the core block 210. Therefore, in the core block 210, multiple cooling medium flow paths 204 are arranged at every predetermined angle θ in the circumferential direction.

Figure 7:
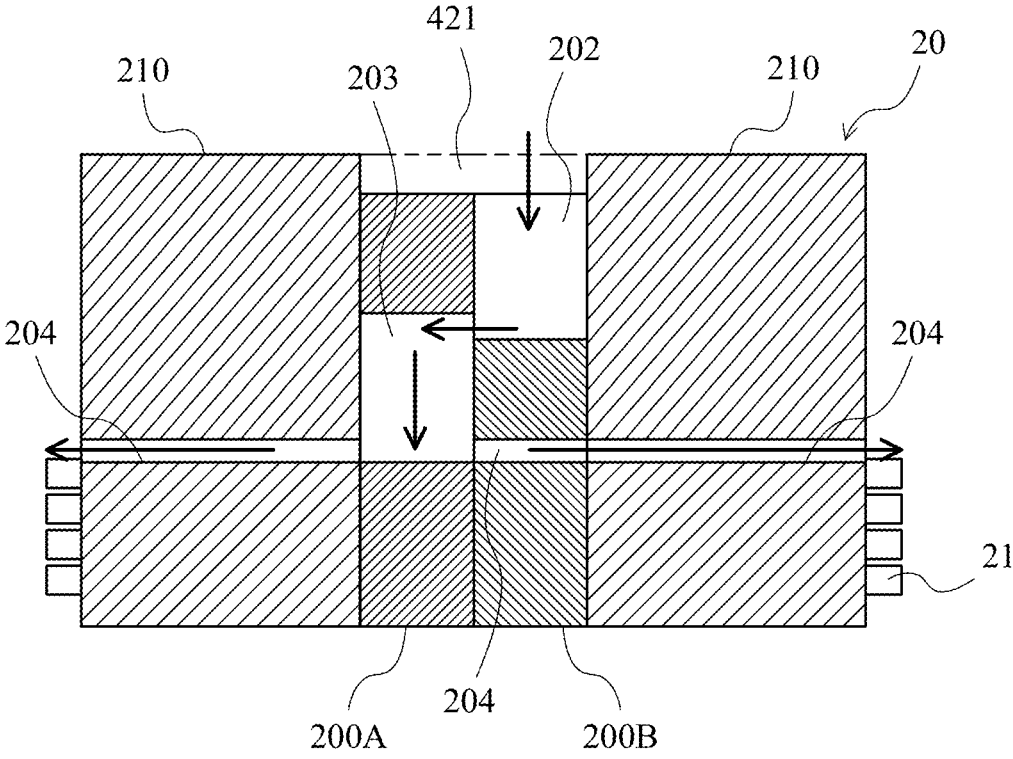
FIG. 7 is a cross sectional view of the stator core along line D1-D1 in FIG. 3.

FIG. 7 is a cross sectional view of the stator core 20 along line D1-D1 in FIG. 3. FIG. 7 shows a pair of the core blocks 210 and the stator coil 21, in addition to the core blocks 200A and 200B. As shown in FIG. 7, the radially outer end portion of the cooling medium flow path 203 of the core block 200A faces the radially inner end portion of the cooling medium flow path 202 of the core block 200B. The radially inner end portion of the cooling medium flow path 203 of the core block 200A faces the cooling medium flow path 204 of the core block 200B and the cooling medium flow path 204 of core block 210 adjacent to the core block 200A. The cooling medium flow path 204 of the core block 200B faces the cooling medium flow path 204 of the core block 210 adjacent to the core block 200B.

In FIG. 7, a flow of the cooling medium is indicated by arrows. The cooling medium supplied from the outside flows into the annular cooling medium flow path 421 between the case 4 and the core blocks 200A and 200B through the through hole 420 of the case 4 shown in FIG. 1. The cooling medium in the cooling medium flow path 421 flows into the cooling medium flow path 202 of the core block 200B, then passes through the cooling medium flow paths 203 and 204, flows out from the axially outer end surfaces of the pair of core blocks 210 and flows towards the coil end. Thus, by the cooling medium flowing inside the core blocks 200A, 200B and 210, the stator core 20 can be efficiently cooled. Furthermore, the stator coil 21 placed in the slot 201 can be cooled via the stator core 20.

Figure 8:
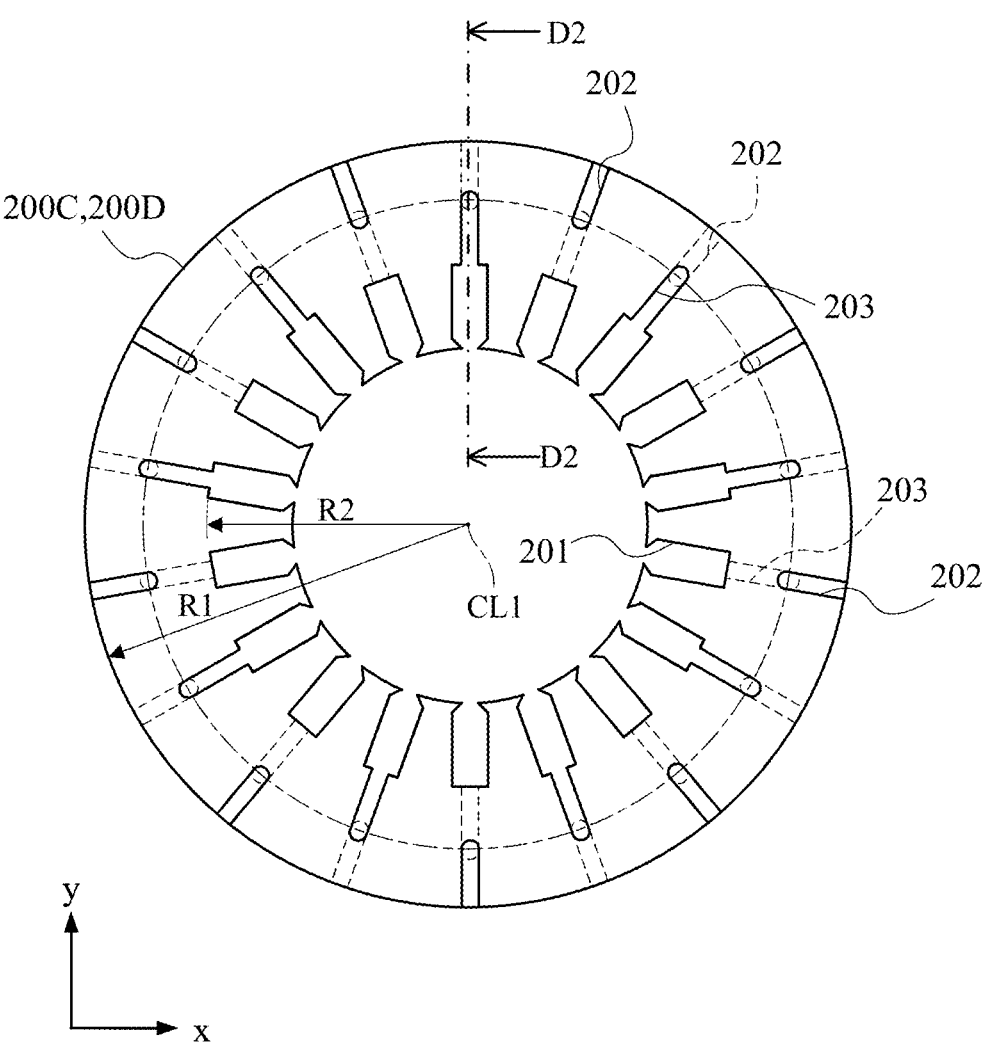
FIG. 8 is a front view of a stacked body of a pair of core blocks as a modified example of FIG. 3.

FIG. 8 is a front view of a stacked body of the core blocks 200C and 200D, which are modified examples of the core blocks 200A and 200B. In FIG. 8, the core block 200C is placed on one side of the Z-axis, and the core block 200D is placed on the other side of the Z-axis. The core block 200C and the core block 200D have the same shape. The cooling medium flow paths 202 and 203 indicated by solid lines in FIG. 8 are formed in the core block 200C, and those indicated by dashed lines are formed in the core block 200D.

Figure 9:
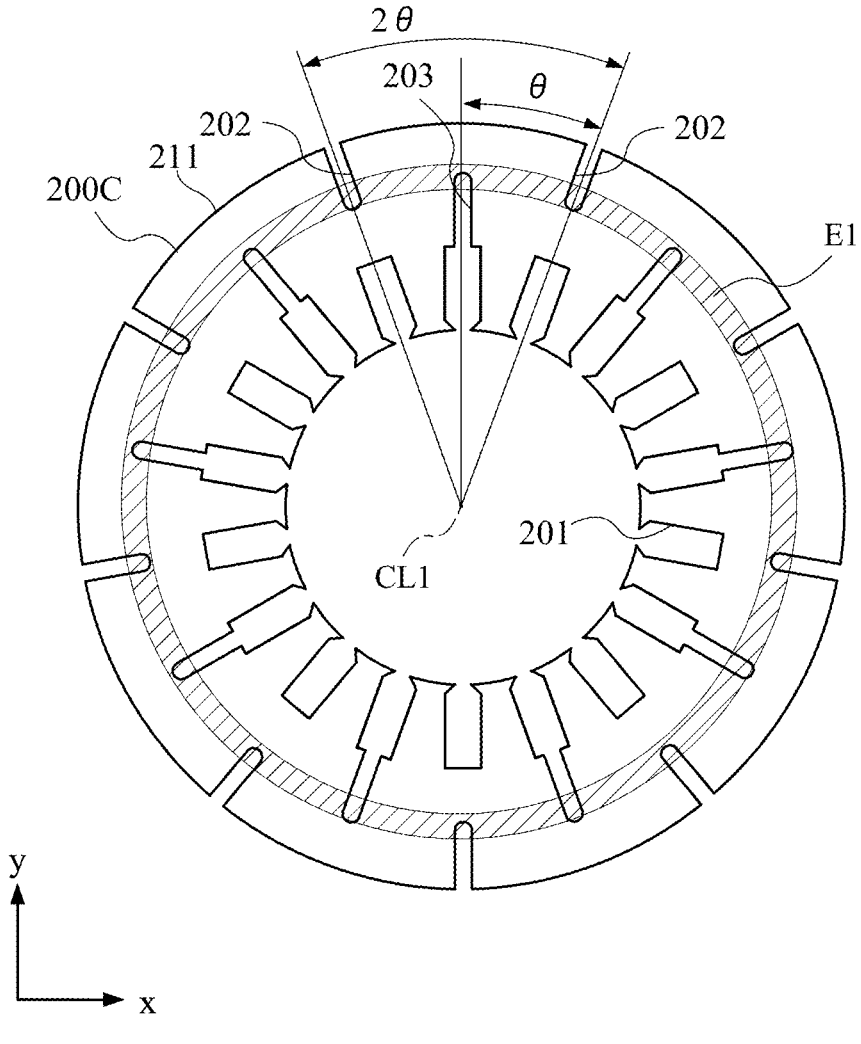
FIG. 9 is a front view of one core block in FIG. 8.

FIG. 9 is a front view of the core block 200C in FIG. 8. In the core block 200C, multiple cooling medium flow paths 202 and multiple cooking medium flow paths 203 are alternately arranged at every predetermined angle θ in the circumferential direction. The circumferential positions of the cooling medium flow paths 202 and 203 of the core block 200C are the same as the circumferential positions of the slots 201. The cooling medium flow path 202 extends radially from the outer peripheral surface 211 of the core block 200C similar to the cooling medium flow path 202 of the core block 200A shown in FIG. 4, and its radially inner end portion extends to the region E1 set in the annular shape around the axial line CL1. The cooling medium flow path 203 extends from the region E1 to the slot 201 on its radially inner side, and the radially inner end portion of the cooling medium flow path 203 communicates with the slot 201.

When stacking the core block 200D on the core block 200C, the core block 200D is rotated by the predetermined angle θ in the circumferential direction relative to the core block 200C, as shown in FIG. 8. In the stacked state of the core blocks 200C and 200D, the radially inner end portion of the cooling medium flow path 202 of the core block 200C and the radially outer end portion of the cooling medium flow path 203 of the core block 200D face each other in the axial direction. Also, the radially inner end portion of the cooling medium flow path 202 of the core block 200D faces the radially outer end portion of the cooling medium flow path 203 of the core block 200C. As a result, the cooling medium flow path 202 of the core block 200C communicates with the cooling medium flow path 203 of the core block 200D, and the cooling medium flow path 203 of the core block 200C communicates with the cooling medium flow path 202 of the core block 200D.

Figure 10:
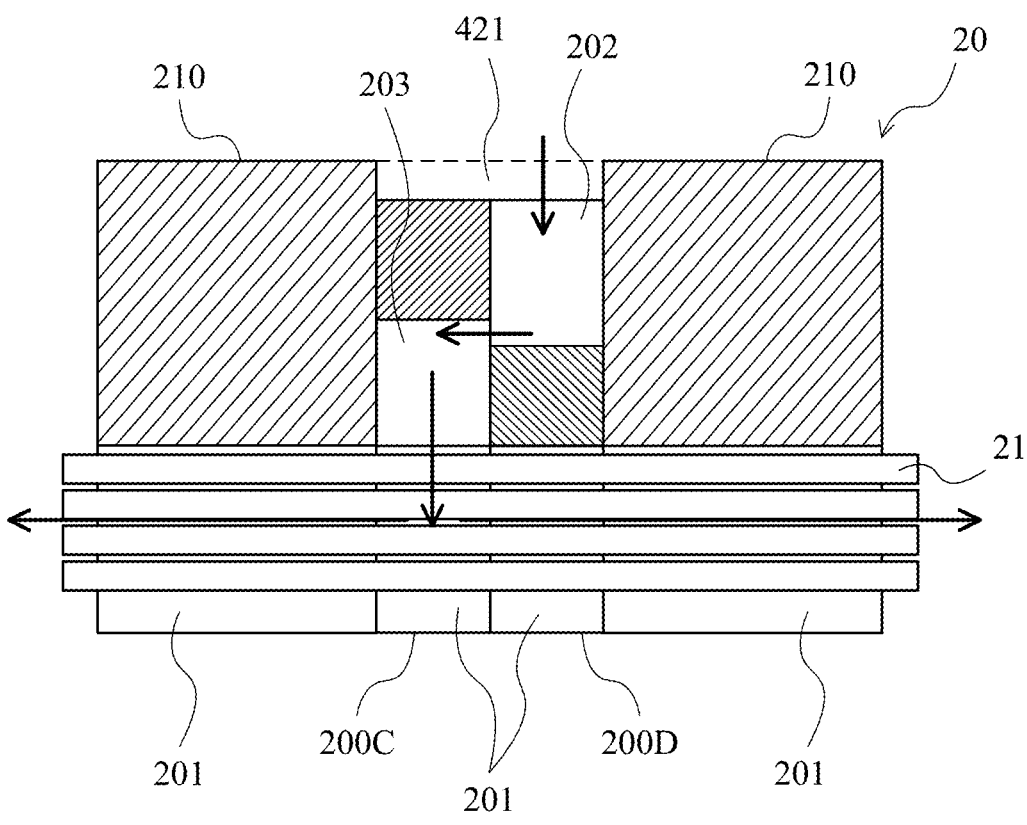
FIG. 10 is a cross sectional view of the stator core along line D2-D2 in FIG. 8.

FIG. 10 is a cross sectional view of the stator core 20 along the line D2-D2 in FIG. 8. FIG. 10 shows a pair of the core blocks 210 and the stator coil 21, in addition to the core blocks 200C and 200D. As shown in FIG. 10, the radially outer end portion of the cooling medium flow path 203 of the core block 200C faces the radially inner end portion of the cooling medium flow path 202 of the core block 200D. Furthermore, the radially inner end portion of the cooling medium flow path 203 of the core block 200C communicates with the slot 201.

As indicated by arrows in FIG. 10, the cooling medium supplied into the annular cooling medium flow path 421 from the outside flows into the cooling medium flow path 202 of the core block 200D, then passes through the cooling medium flow path 203 of the core block 200C and flows into the slot 201. The cooling medium flowed into the slot flows axially through the gaps in the slot 201 and flows towards the coil end. Thus, the cooling medium not only flows through the core blocks 200C and 200D, but is also introduced into the slot 201, allowing for direct cooling the stator coil 21 with the cooling medium. As a result, it is possible to further improve the cooling efficiency.

Figure 11:
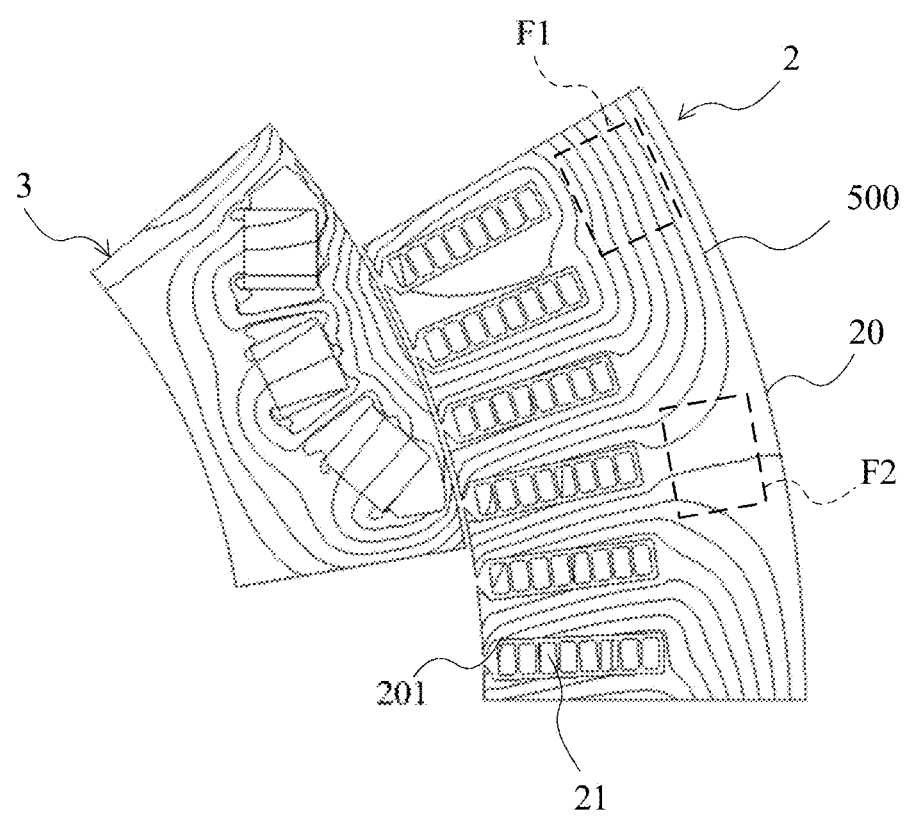
FIG. 11 is a diagram showing an example of a distribution of magnetic flux density when no cooling medium flow path is provided in the stator core.

Incidentally, when a cooling medium flow path is formed in the stator core, the distribution of magnetic flux density changes, resulting in a reduction in torque compared to a case that there is no cooling medium flow path. FIG. 11 is a diagram showing an example of the distribution of magnetic flux density when no cooling medium flow path is provided in the stator core 20. In FIG. 11, a part of the rotor 3 and the stator 2 is shown, along with lines 500 representing magnetic flux density (hereinafter referred to as magnetic flux lines). The number of the magnetic flux lines 500 per unit volume represents the magnitude of the magnetic flux density, and the magnetic flux density is indicated by the concentration of the magnetic flux lines 500 and the direction in which the magnetic flux lines extend. In the example shown in FIG. 11, considering the number of the magnetic flux lines 500, the magnetic flux density in a region F1 is greater than that in a region F2.

Figure 12A:
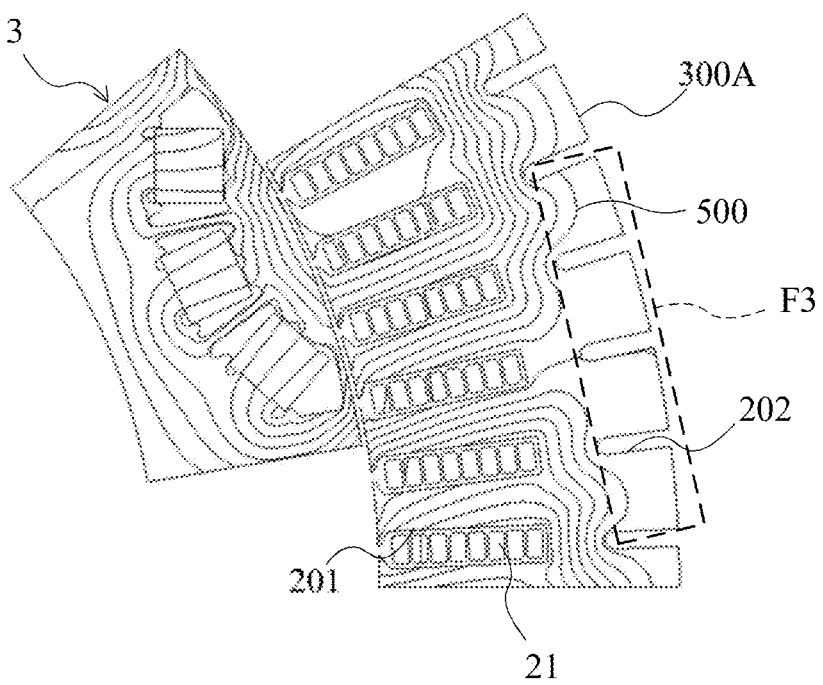
FIG. 12A is a diagram showing the distribution of magnetic flux density for one of a pair of core blocks as a comparative example of the first embodiment of the present invention.
Figure 12B:
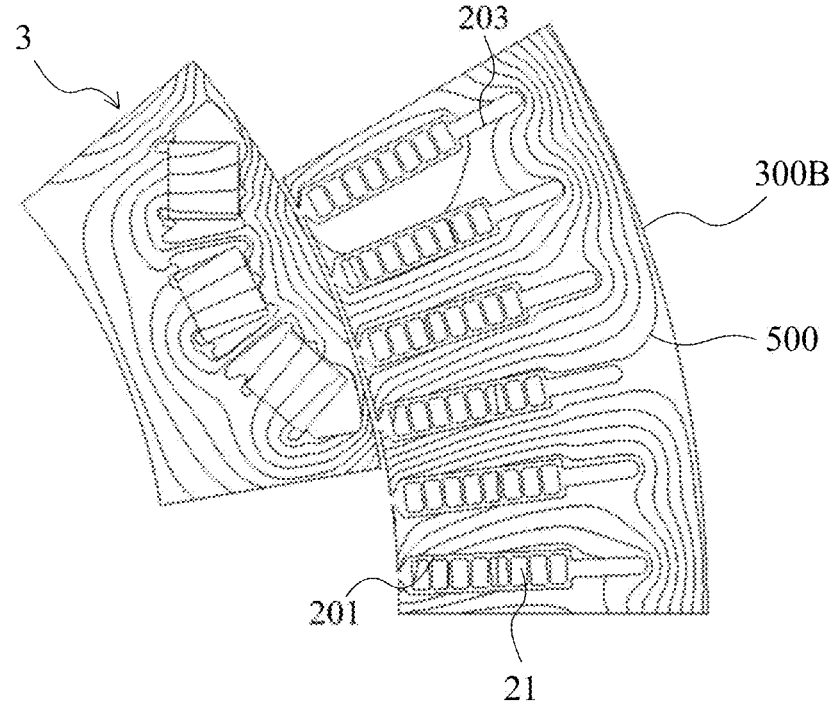
FIG. 12B is a diagram showing the distribution of magnetic flux density for the other of the pair of core blocks as the comparative example of the first embodiment of the present invention.
Figure 13:
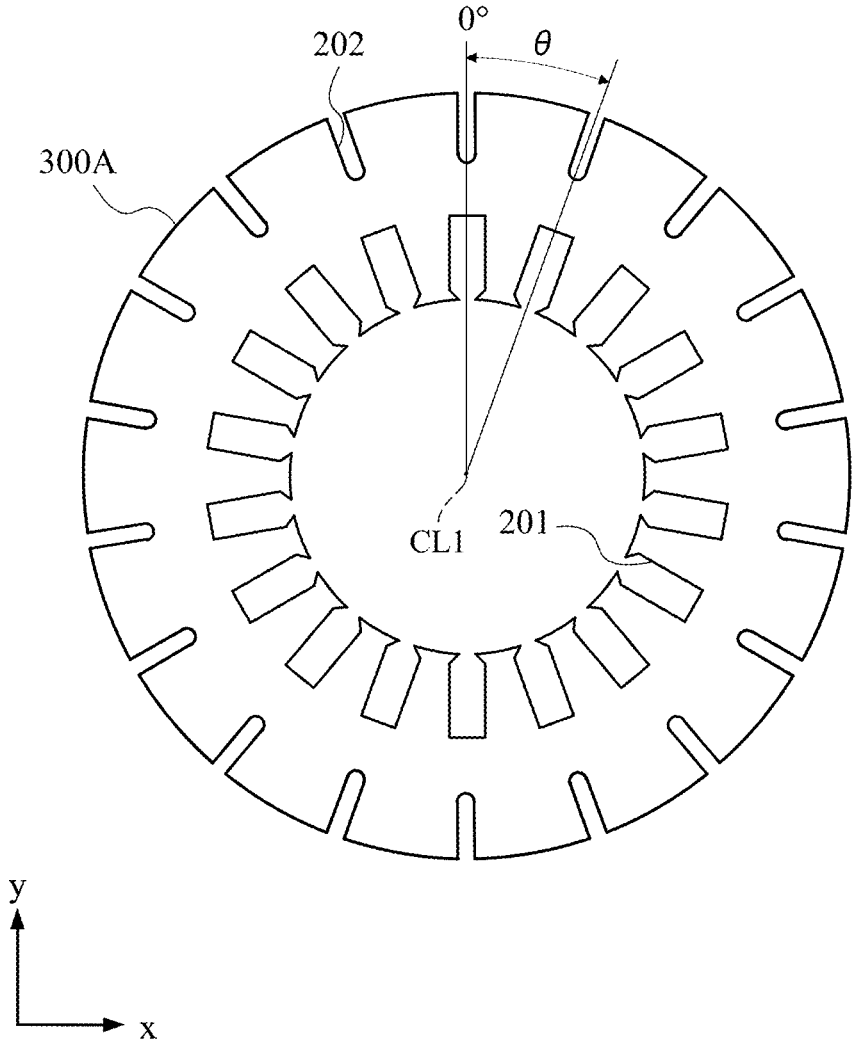
FIG. 13 is a front view of one of the pair of core blocks as the comparative example of the first embodiment of the present invention.
Figure 14:
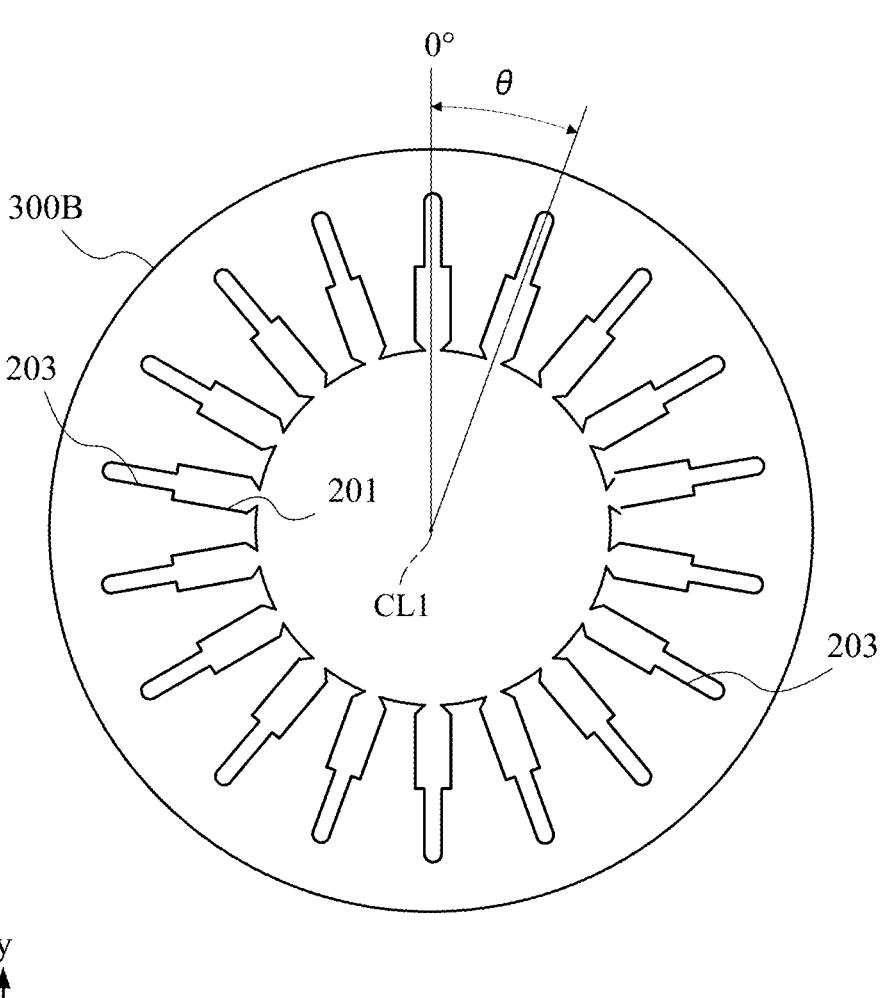
FIG. 14 is a front view of the other of the pair of core blocks as the comparative example of the first embodiment of the present invention.

FIGS. 12A and 12B are diagrams showing the distribution of magnetic flux density (distribution of magnetic flux lines 500) when the cooling medium flow paths 202 and 203 are formed in the core blocks 300A and 300B, which are comparative examples of this embodiment, respectively. FIGS. 13 and 14 are front views of the core blocks 300A and 300B, respectively. As shown in FIG. 13, in the core block 300A, multiple cooling medium flow paths 202 are formed at every predetermined angle θ in the circumferential direction. The positions in the circumferential direction of the cooling medium flow paths 202 are the same as the positions in the circumferential direction of the slots 201. As shown in FIG. 14, in the core block 300B, multiple cooling medium flow paths 203 that communicate with the slots 201 are formed at every predetermined angle θ in the circumferential direction. When stacking the core block 300B on the core block 300A, the radially inner end portion of the cooling medium flow path 202 and the radially outer end portion of the cooling medium flow path 203 face each other in the axial direction, and the cooling medium flow paths 202 and 203 communicate with each other.

FIG. 12A shows the distribution of magnetic flux density in the core block 300A, and FIG. 12B shows the distribution of magnetic flux density in the core block 300B. As shown in FIG. 12A, in the core block 300A, the flow of magnetic flux lines 500 is obstructed by the cooling medium flow path 202 extending in the radial direction, and in the area indicated by the symbol F3 in the back yoke (the core portion radially outside of slot 201), hardly any magnetic flux lines 500 are seen. As a result, the torque significantly decreases.

Figure 15:
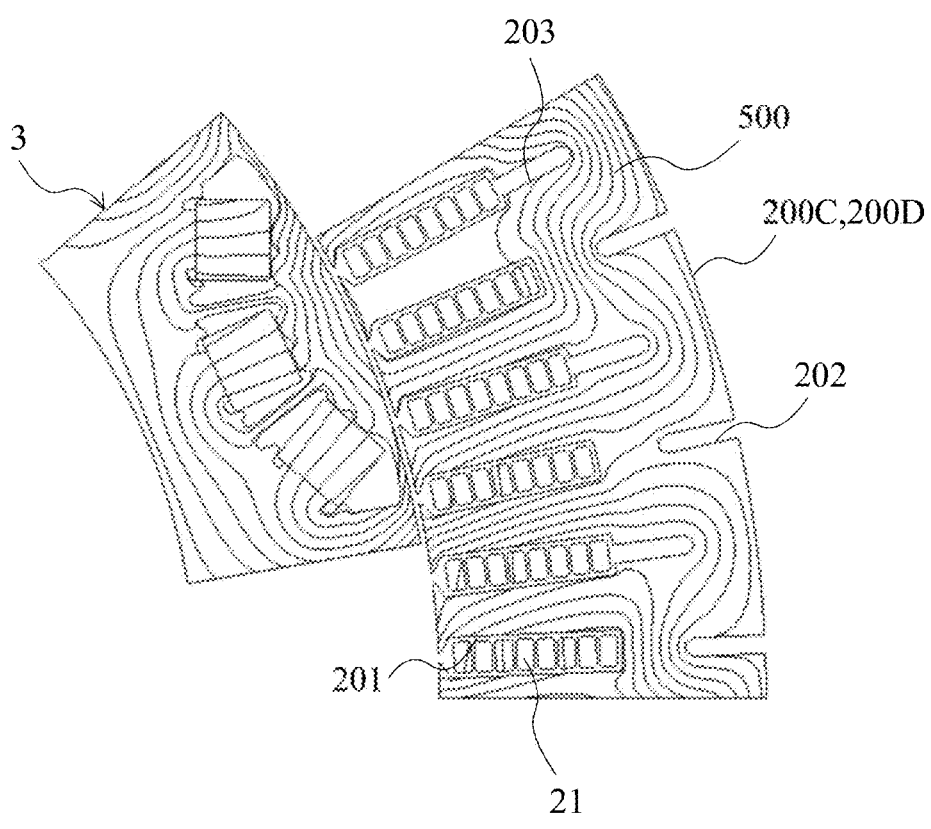
FIG. 15 is a diagram showing the distribution of magnetic flux density in the core blocks in FIGS. 8 and 9.

FIG. 15 is a diagram showing the distribution of magnetic flux density in the core blocks 200C and 200D (FIGS. 8, 9) included in the rotating electric machine 1 according to this embodiment. Since the core blocks 200C and 200D have the same shape, the distributions of magnetic flux density are also the same. As shown in FIG. 9, the radial outer cooling medium flow path 202 and the radial inner cooling medium flow path 203 provided in the back yoke of the core block 200C are alternately arranged in the circumferential direction at every predetermined angle θ. Therefore, as shown in FIG. 15, magnetic flux lines 500 are distributed throughout the back yoke, which reduces torque loss compared to the comparative example (FIGS. 12A and 12B).

Although not shown, the core blocks 200A and 200B (FIGS. 2 and 3) also have the distribution of magnetic flux density similar to those of core blocks 200C and 200D, which can reduce torque loss. In the core block 210 of FIG. 6, since the cooling medium flow path 204 is formed only near the slot 201, it is possible to further reduce torque loss compared to the core blocks 200A and 200B.

As shown in FIG. 8, the inner end portion in the radial direction of the cooling medium flow path 202 of the core block 200C and the outer end portion in the radial direction of the cooling medium flow path 203 of the core block 200D, as well as the inner end portion in the radial direction of the cooling medium flow path 202 of the core block 200D and the outer end portion in the radial direction of the cooling medium flow path 203 of the core block 200C, face each other in the axial direction in the annular region E1 (refer to FIG. 9). The radial position of this region E1 is defined as the deviation amount $\Delta R$ from the radial central position of the back yoke. If the outer diameter of the core blocks 200C and 200D is R1, and the distance from the axial line CL1 to the bottom of the slot 201 (radial outer end) is R2, then the radial central position of the back yoke is (R1+R2)/2. If the region E1 is at the radial central position of the back yoke, then $\Delta R=0$; if it is located radially outward of the central position, then $\Delta R>0$; if it is located radially inward of the central position, then $\Delta R<0$.

Figure 16:
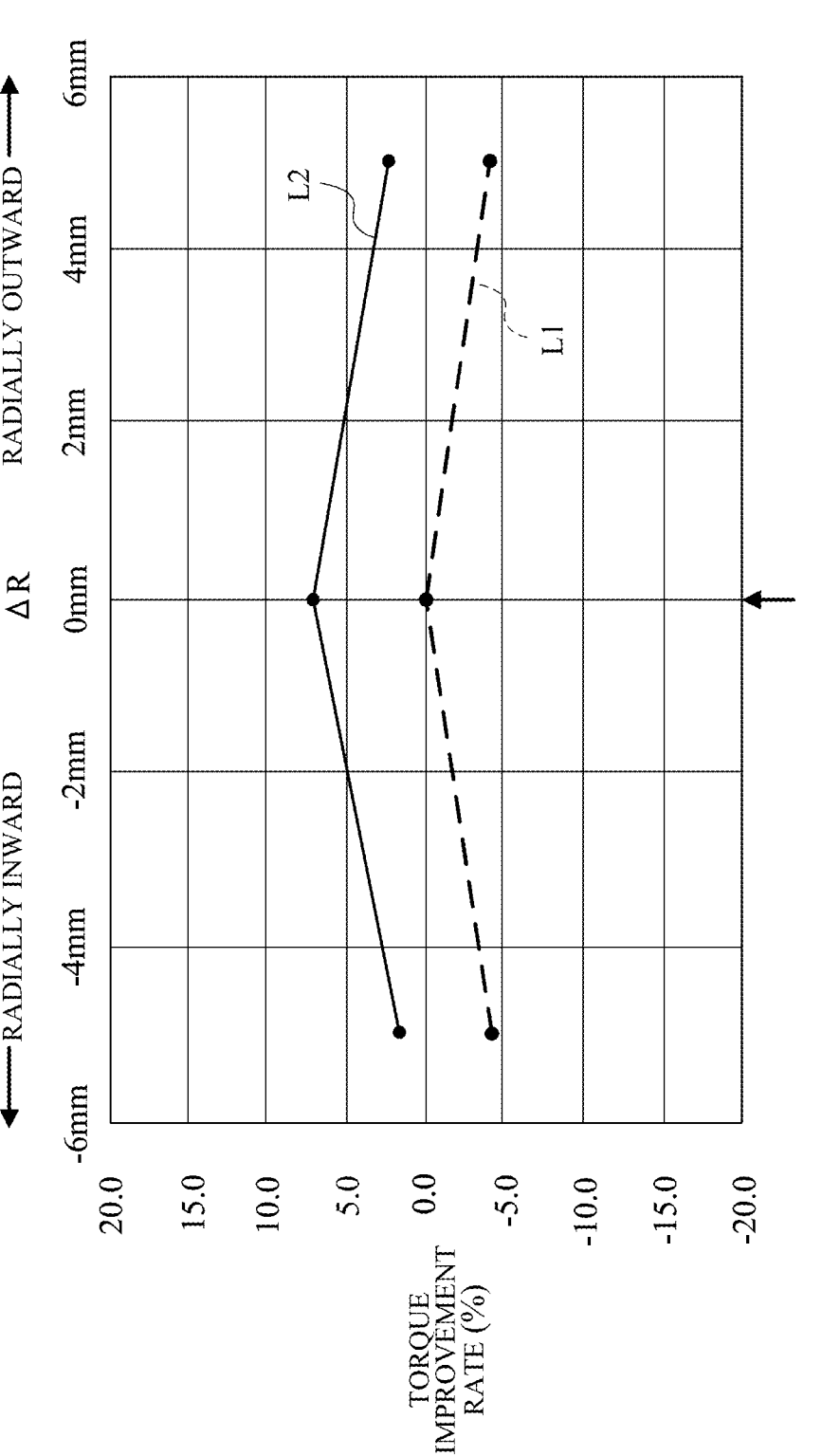
FIG. 16 is a diagram showing a relationship between a position of a region where the cooling medium flow paths communicate with each other and a torque improvement rate in the first embodiment.

FIG. 16 is a diagram showing the relationship between the position of the region E1 where the cooling medium flow paths 202 and 203 communicate with each other and a torque improvement rate (percent) with respect to the comparative examples in FIGS. 13 and 14. The characteristic L1 shown by the dashed line indicates the torque improvement rate by the comparative example, and the characteristic L2 shown by the solid line indicates the torque improvement rate when using the core blocks 200C and 200D in FIGS. 8 and 9. In FIG. 16, the torque improvement rate is shown using torque for $\Delta R=0$ in the comparative example as a reference (0%). As shown by characteristic L1, in the comparative example, the case of $\Delta R=0$ has the smallest degree of torque reduction (0%). Then, as the region E1 moves to the radial inside and radial outside from $\Delta R=0$, the torque improvement rate decreases, and the degree of torque reduction increases.

In the case of the core blocks 200C and 200D shown in FIGS. 8 and 9, as indicated by characteristic L2, the torque improvement rate is greatest at $\Delta R=0$, and decreases as the region E1 moves to the radial inside and outside from $\Delta R=0$. However, in characteristic L2, unlike characteristic L1, the torque improvement rate remains positive regardless of whether the region E1 shifts to the radial outside or the radial inside.

As described above, in the first embodiment and the modified example, the cooling medium flow paths 202 to 204 are formed in the core blocks 200A and 200B and the core blocks 200C and 200D of the stator core 20. This allows for improved cooling performance of the stator core 20 and the stator coil 21 while suppressing torque loss caused by the provision of the cooling medium flow paths 202 to 204. As shown in FIGS. 2, 6 and 7, by including the core block 210, which forms only the flow path 204, in the stator core 20, it is possible to further suppress the torque loss.

Second Embodiment

Figure 17:
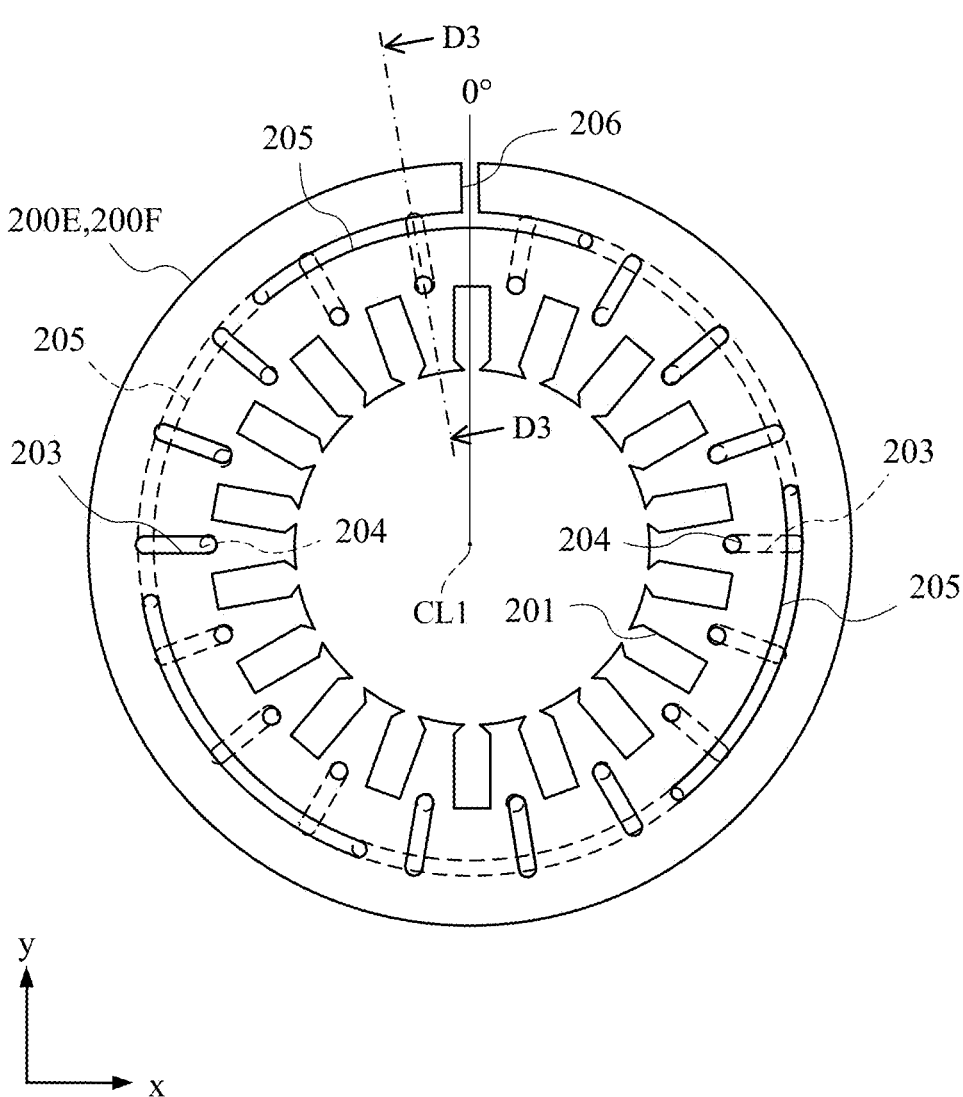
FIG. 17 is a front view of a stacked body of a pair of core blocks included in a rotating electric machine according to a second embodiment of the present invention.
Figure 18:
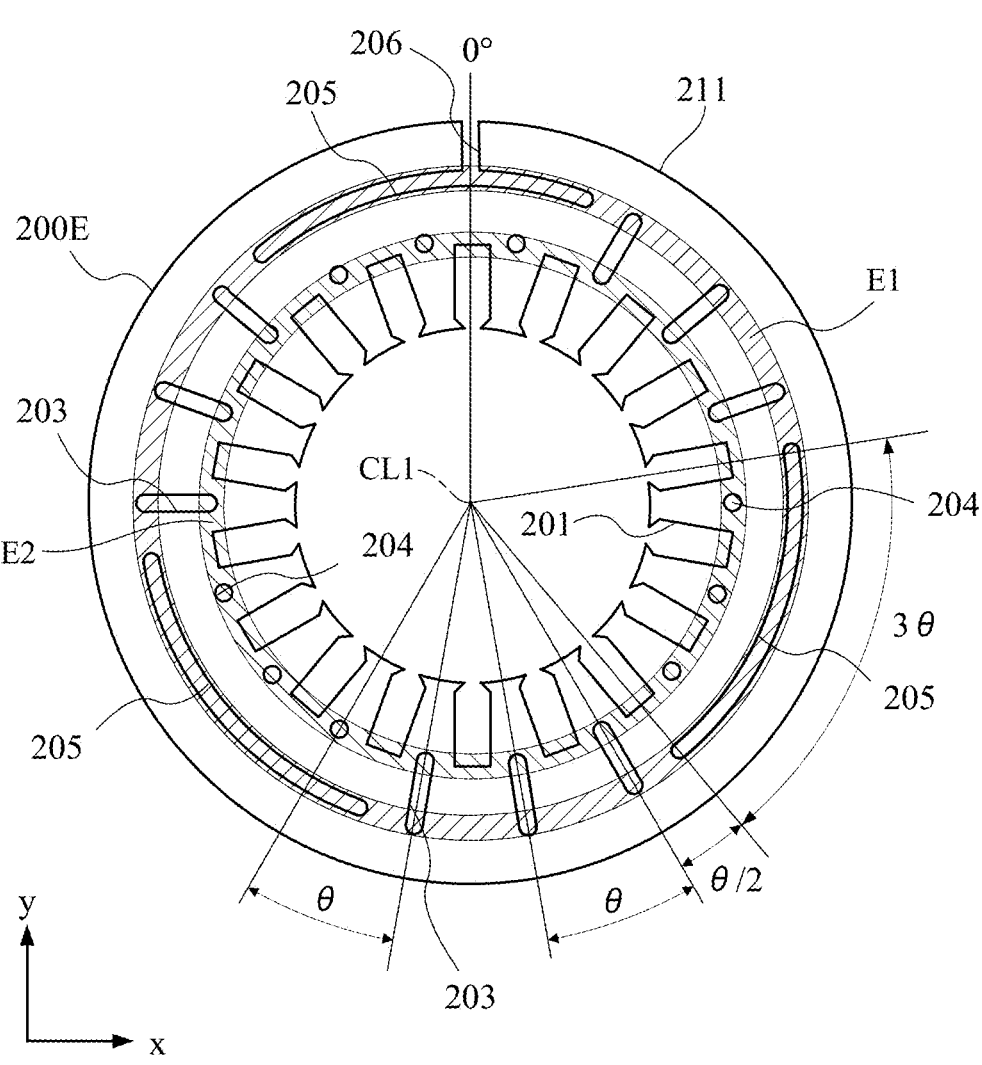
FIG. 18 is a front view of one core block in FIG. 17.
Figure 19:
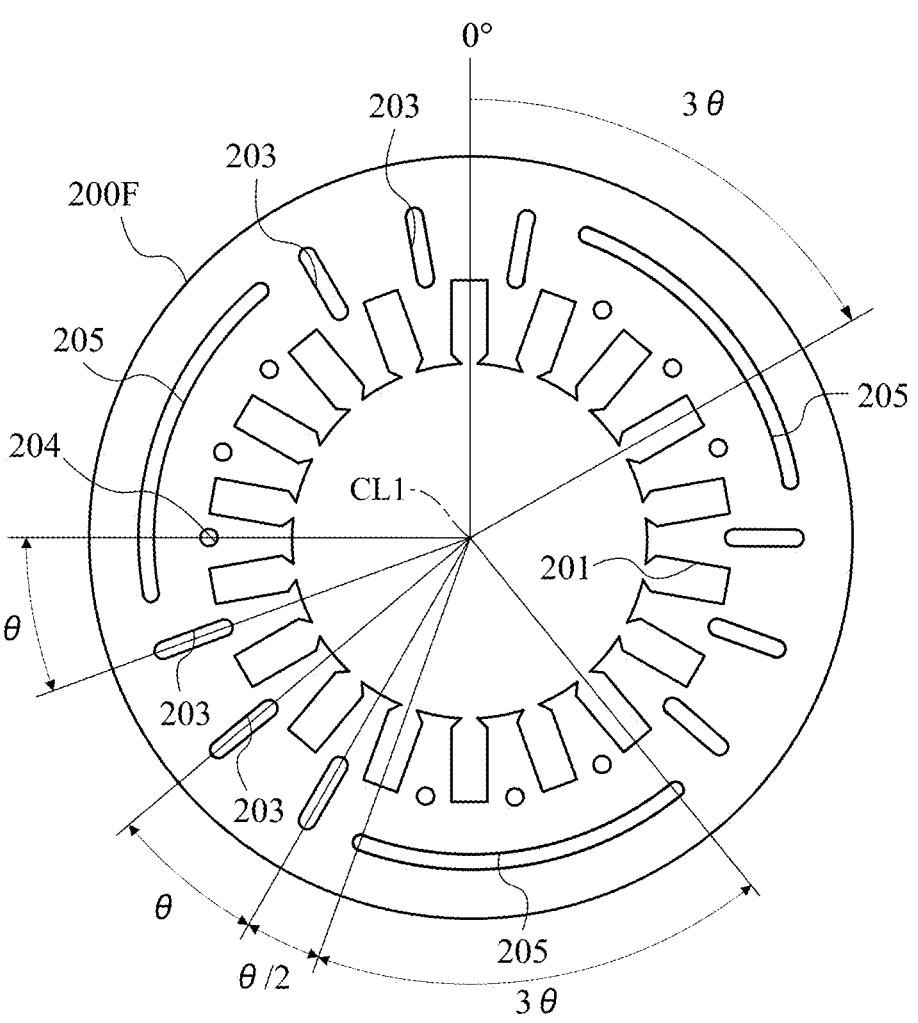
FIG. 19 is a front view of the other core block in FIG. 17.
Figure 19:
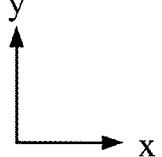

A second embodiment of the present invention will be described with reference to FIGS. 17 to 28. FIG. 17 is a front view of a stacked body of the core blocks 200E and 200F included in a rotating electric machine 1 according to the second embodiment of the present invention. FIG. 18 is a front view of the core block 200E, and FIG. 19 is a front view of the core block 200F. In FIG. 17, the core block 200E is placed on one side of the Z-axis, and the core block 200F is placed on the other side of the Z-axis.

As shown in FIG. 18, in the core block 200E, a plurality of cooling medium flow paths 203 extending in the radial direction, a plurality of cooling medium flow paths 204, and a plurality of cooling medium flow paths 205 extending in the circumferential direction are provided in the circumferential direction. These cooling medium flow paths 203 to 205 extend in the axial direction and penetrate the core block 200E. Furthermore, in one of the plurality of cooling medium flow paths 205 (for example, the top cooling medium flow path 205), a cooling medium inlet path 206 extending radially over the outer peripheral surface 211 of the core block 200E is provided. In the core block 200E, eighteen slots 201 are arranged at every predetermined angle θ in the circumferential direction. The predetermined angle θ is 20°. Three cooling medium flow paths 205 are provided at equal intervals in the circumferential direction in the region E1 set in an annular shape around the axial line CL1.

The cooling medium flow paths 205 are arranged at every predetermined angle 3θ and each extends over the predetermined angle 3θ.

In the region between the circumferentially adjacent cooling medium flow paths 205 and 205 of the core block 200E, three cooling medium flow paths 203 are arranged at every predetermined angle θ. The cooling medium flow path 203 extends from the annular region E1 to the radially inner region E2 set in an annular shape around the axial line CL1, similar to the cooling medium flow path 203 in FIG. 4. In the radially inner region E2 of the cooling medium flow path 205 of the core block 200E, three cooling medium flow paths 204 are arranged at every predetermined angle θ. The cooling medium flow path 204 is arranged between the circumferentially adjacent slots 201 and 201. The cooling medium flow path 203 is also arranged between the circumferentially adjacent slots 201, 201. Therefore, in the region E2 of the core block 200E, three cooling medium flow paths 203 and three cooling medium flow paths 204 are alternately arranged in the circumferential direction at every predetermined angle 3θ.

As shown in FIG. 19, unlike the core block 200E, the cooling medium inlet path 206 is not provided in the core block 200F. Except for this point, the core block 200F is configured identically to the core block 200E. The core block 200F is arranged by rotating in a clockwise direction by a predetermined angle 3θ around the axial line CL1 with respect to the core block 200E, thereby the core blocks 200E and 200F are stacked as shown in FIG. 17.

As shown in FIG. 17, when the core blocks 200E and 200F are stacked, the circumferential end portion of the cooling medium flow path 205 of the core block 200E overlaps with the circumferential end portion of the cooling medium flow path 205 of the core block 200F. As a result, the cooling medium flow path 205 of the core block 200E and the cooling medium flow path 205 of the core block 200F communicate with each other, and a substantially annular flow path as a whole is formed in the core blocks 200E and 200F.

Furthermore, the cooling medium flow path 205 of the core block 200E faces the outer end portion in the radial direction of the cooling medium flow path 203 of the core block 200F, and the inner end portion in the radial direction of the cooling medium flow path 203 of the core block 200F faces the cooling medium flow path 204 of the core block 200E. The cooling medium flow path 205 of the core block 200F faces the outer end portion in the radial direction of the cooling medium flow path 203 of the core block 200E, and the inner end portion in the radial direction of the cooling medium flow path 203 of the core block 200E faces the cooling medium flow path 204 of core block 200F.

Figure 20:
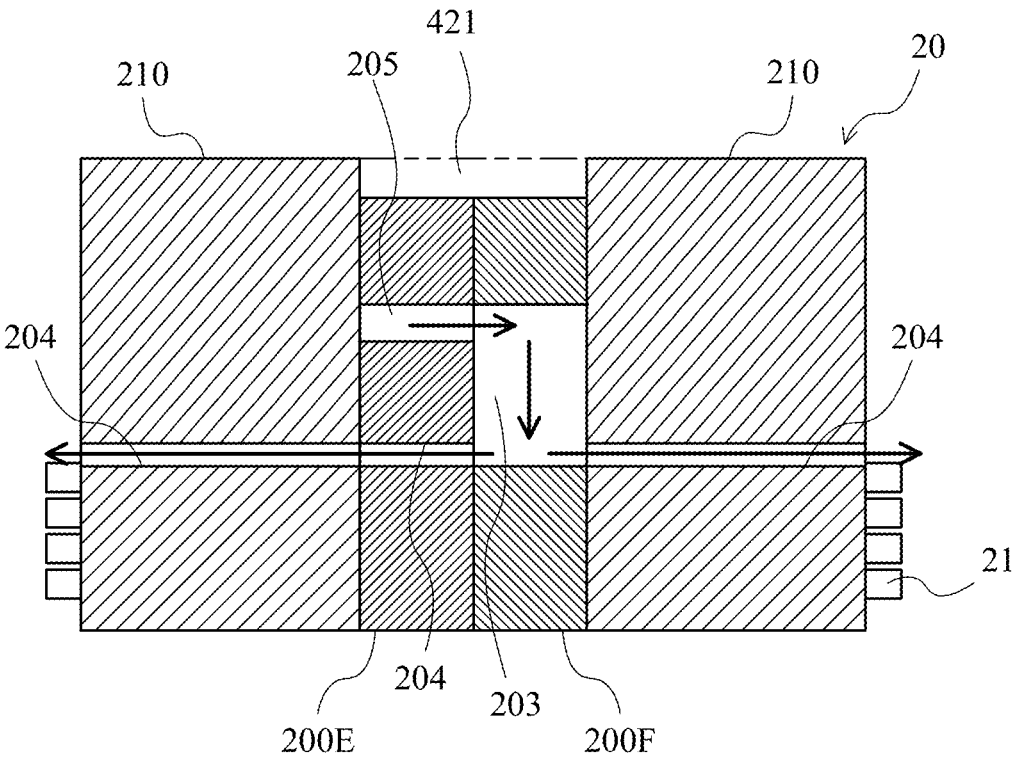
FIG. 20 is a cross sectional view of a stator core along line D3-D3 in FIG. 17.

FIG. 20 is a cross sectional view of the stator core 20 along the line D3-D3 in FIG. 17. FIG. 20 shows a pair of core blocks 210 and a stator coil 21, in addition to the core blocks 200E and 200F. As shown in FIG. 20, the outer end portion in the radial direction of the cooling medium flow path 203 of core block 200F faces the cooling medium flow path 205 of the core block 200E. The inner end portion in the radial direction of the cooling medium flow path 203 of the core block 200F faces the cooling medium flow path 204 of the core block 200E and the cooling medium flow path 204 of the core block 210 adjacent to the core block 200F. The cooling medium flow path 204 of the core block 200E faces the cooling medium flow path 204 of the core block 210 adjacent to the core block 200E.

The annular cooling medium flow path 421 is formed facing the inner peripheral surface of the case 4 (FIG. 1).

Cooling medium is supplied to this cooling medium flow path 421 from the outside through the through hole 420 of the case 4 (FIG. 1). The cooling medium in the cooling medium flow path 421 flows into the cooling medium flow path 205 through the cooling medium inlet path 206 of the core block 200E (FIG. 17). The cooling medium flowing into the cooling medium flow path 205 passes through the cooling medium flow path 203 of the core block 200F and the cooling medium flow paths 204 of the core blocks 200E and 210, as shown by arrows in FIG. 20, flows out from the axially outer end surfaces of the pair of core blocks 210, and flows towards the coil end.

Figure 21:
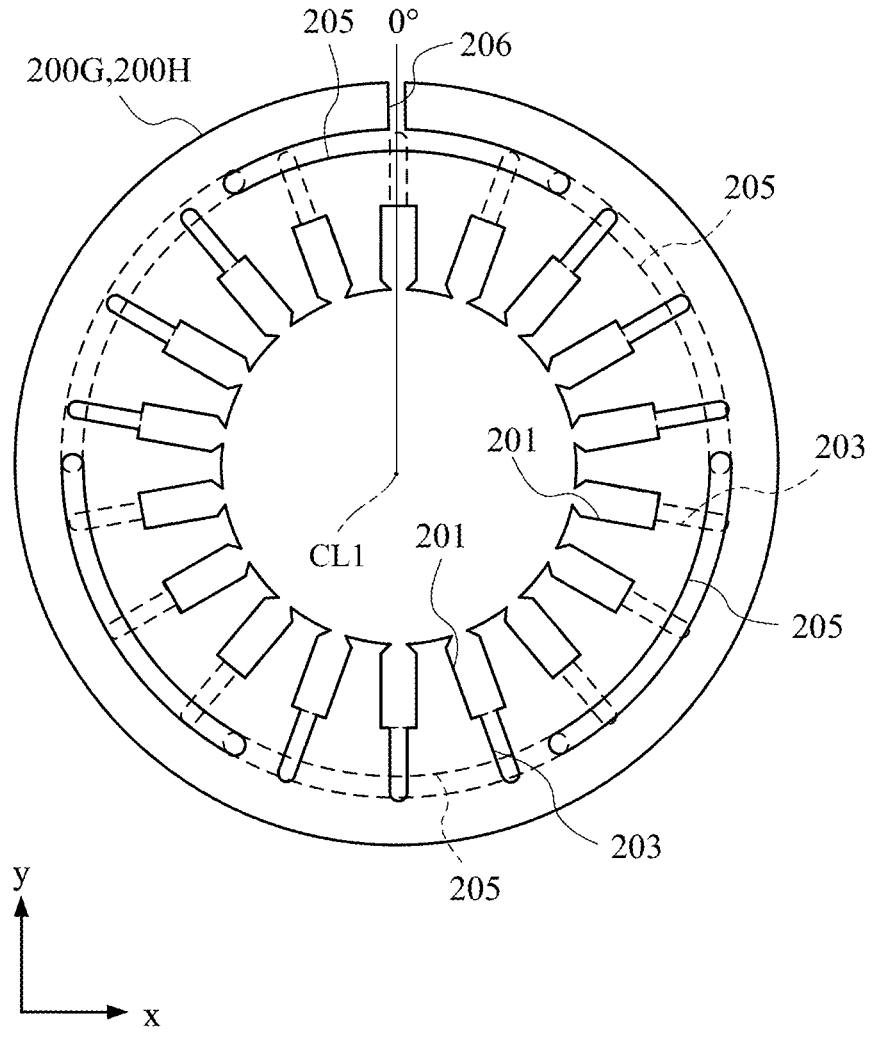
FIG. 21 is a front view of a stacked body of a pair of core blocks as a modified example of FIG. 17.
Figure 22:
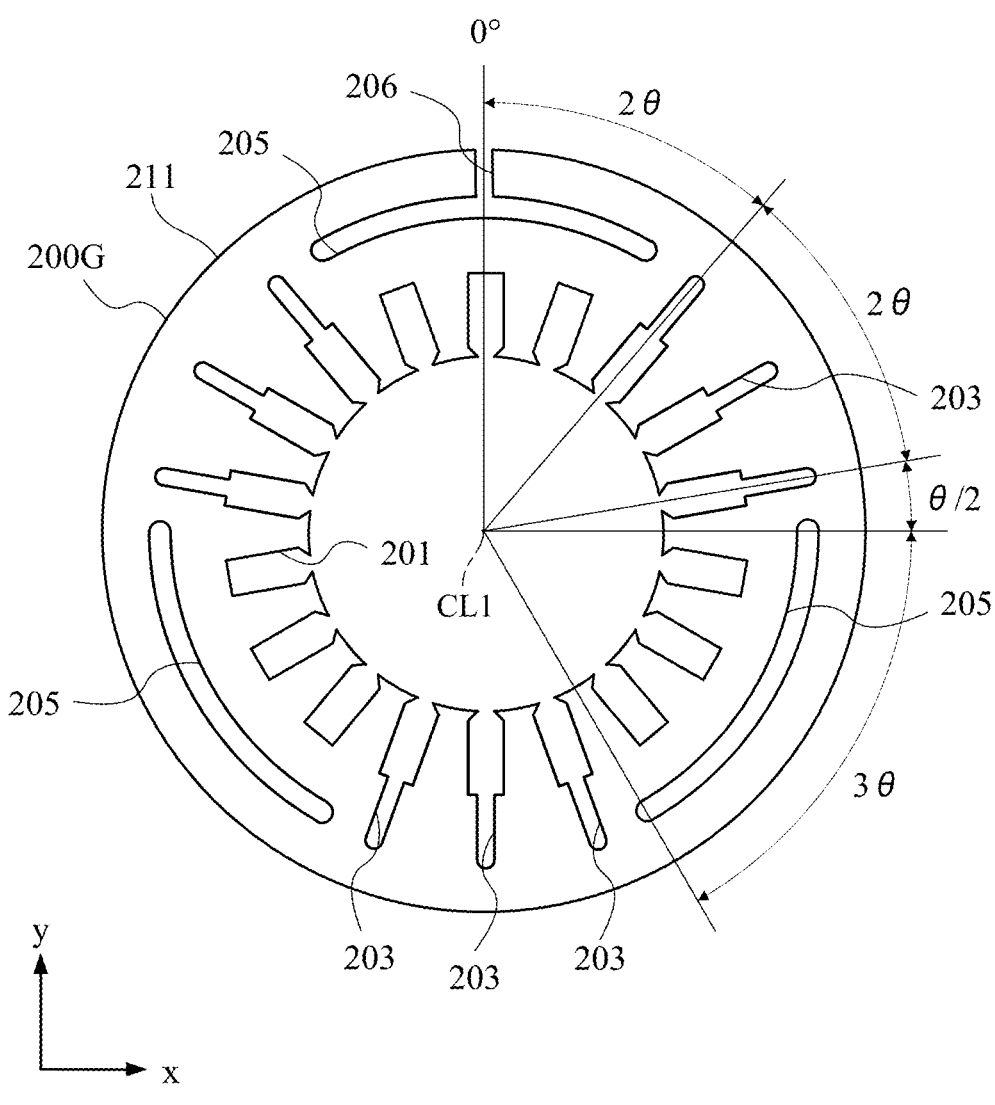
FIG. 22 is a front view of one core block in FIG. 21.

FIG. 21 is a front view of a stacked body of the core blocks 200G and 200H, which are modified examples of the core blocks 200E and 200F. In FIG. 21, the core block 200G is placed on one side in the Z-axis, and the core block 200H is placed on the other side in the Z-axis. FIG. 22 is a front view of the core block 200G, and FIG. 23 is a front view of the core block 200H.

As shown in FIG. 22, in the core block 200G, a cooling medium flow path 203 extending in the radial direction that communicates with the slot 201, a cooling medium flow path 205 extending in the circumferential direction, and a cooling medium inlet path 206 extending radially from the cooling medium flow path 205 to the outer peripheral surface 211 of the core block 200G are provided. Compared to the core block 200E in FIG. 18, the positions in the circumferential direction of the cooling medium flow paths 203 and 205 of the core block 200G are shifted in the clockwise direction by a predetermined angle θ/2. Therefore, the position in the circumferential direction of the cooling medium flow path 203 matches the position in the circumferential direction of the slot 201.

Figure 23:
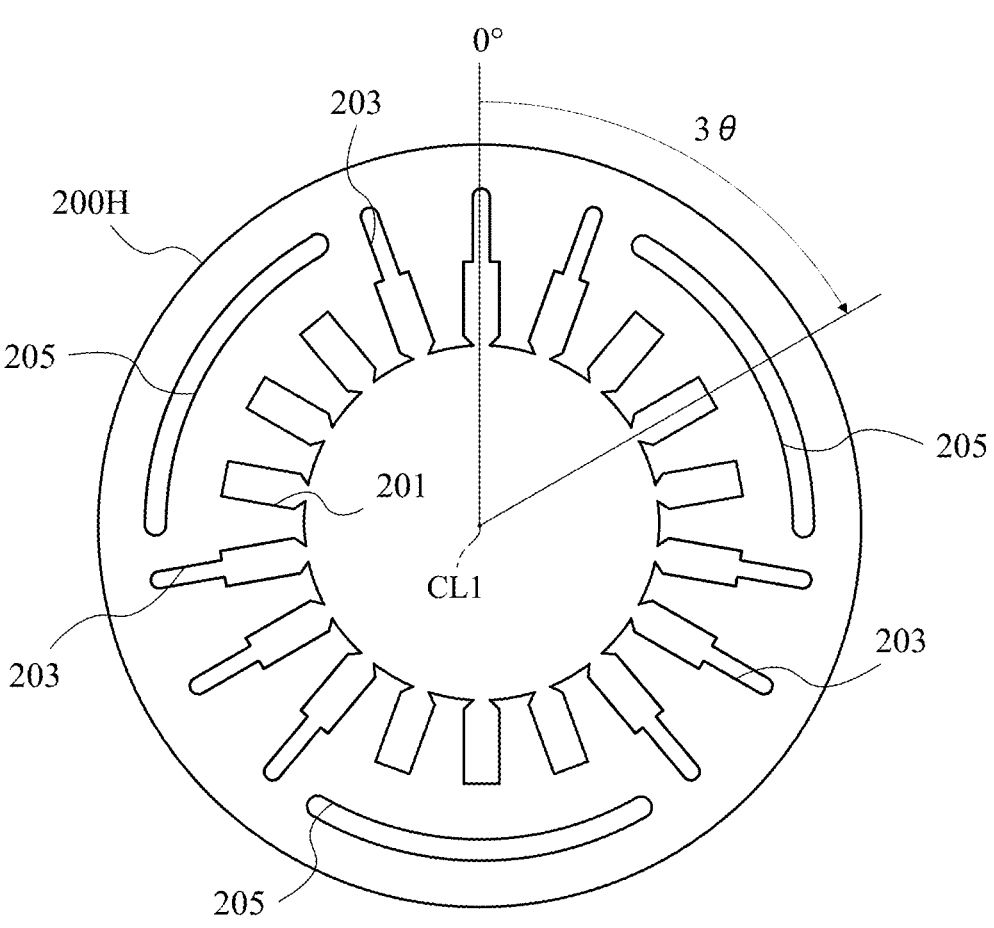
FIG. 23 is a front view of the other core block in FIG. 21.
Figure 23:
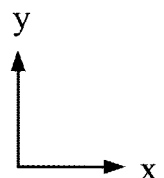

As shown in FIG. 23, a cooling medium inlet path 206 is not provided in the core block 200H, unlike the core block 200G. Except for this point, the core block 200H is configured identically to the core block 200G. The core block 200H is rotated in the clockwise direction by a predetermined angle 3θ around the axial line CL1 relative to the core block 200G, and thus, as shown in FIG. 21, the core blocks 200G and 200H are stacked.

As shown in FIG. 21, when the core blocks 200G and 200H are stacked, the end portion in the circumferential direction of the cooling medium flow path 205 of the core block 200G overlaps with the end portion in the circumferential direction of the cooling medium flow path 205 of the core block 200H. As a result, the cooling medium flow path 205 of the core block 200G communicates with the cooling medium flow path 205 of the core block 200H, and a substantially annular flow path is formed in the core blocks 200G and 200H as a whole. Furthermore, the cooling medium flow path 205 of the core block 200G faces the outer end portion in the radial direction of the cooling medium flow path 203 of the core block 200H, and the cooling medium flow path 205 of the core block 200H faces the outer end portion in the radial direction of the cooling medium flow path 203 of the core block 200G.

In the core blocks 200E and 200F shown in FIG. 17, three cooling medium flow paths 203, and three cooling medium flow paths 205 and 204 are alternately arranged in the circumferential direction at every predetermined angle 3θ. Therefore, by simply shifting the core block 200F by predetermined angle 3θ relative to the core block 200E and stacking them, all cooling medium flow paths 204 can be communicated with the cooling medium flow paths 205 through the cooling medium flow paths 203.

Figure 24:
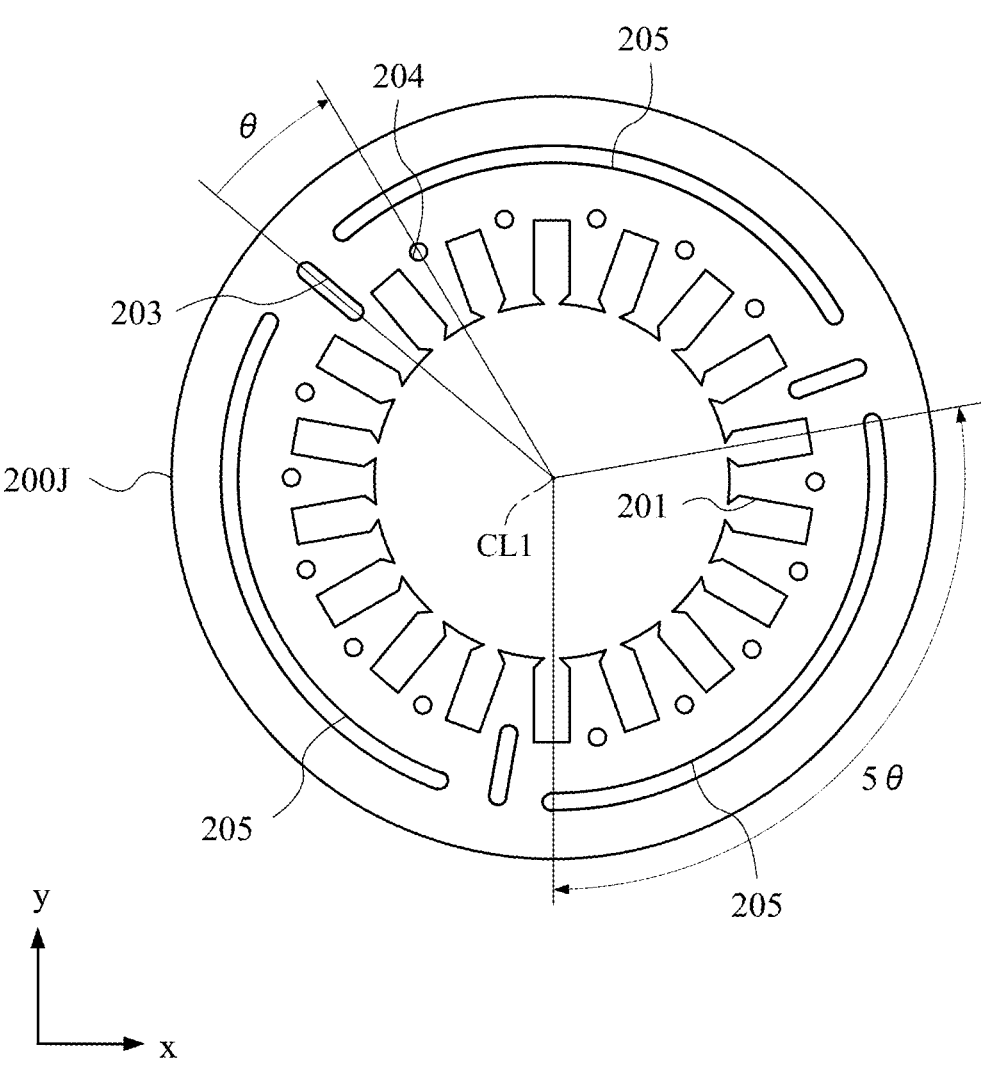
FIG. 24 is a front view of a core block as a comparative example of FIGS. 22 and 23.

On the other hand, in the core block 200J of FIG. 24, which is a comparative example of FIGS. 22 and 23, one cooling medium flow path 203, and one cooling medium flow path 205 and five cooling medium flow paths 204 are alternately arranged in the circumferential direction at every predetermined angle 5θ. In FIG. 24, five reposition in stacking is required in order to communicate all cooling medium flow paths 204 with the cooling medium flow path 205 through the cooling medium flow path 203. That is, it is necessary to prepare six core blocks 200J of FIG. 24 and stack them while shifting by predetermined angle θ each time. Therefore, when the cooling medium flow path 205 extending in the circumferential direction is provided in the core block, it is preferable to alternately arrange the circumferential flow path (cooling medium flow path 205) and the radial flow path (cooling medium flow path 203) at every the same angle (3θ), as shown in FIGS. 17 and 21.

In the first embodiment, for example, as shown in FIGS. 8 and 9, the core block is configured so that the cooling medium flow path 202 extending radially from the outer peripheral surface 211 is provided in the back yoke of the core block and the cooling medium supplied from the outside is guided to the cooling medium flow path 203 inside the cooling medium flow path 202 in the radial direction through the cooling medium flow path 202. On the other hand, in the second embodiment, the core block is configured so that the cooling medium flow path 205 extending in the circumferential direction is provided in the back yoke and the cooling medium is guided to the cooling medium flow path 203 inside the cooling medium flow path 205 in the radial direction, thereby suppressing the reduction in torque caused by the provision of the cooling medium flow path.

Figure 25:
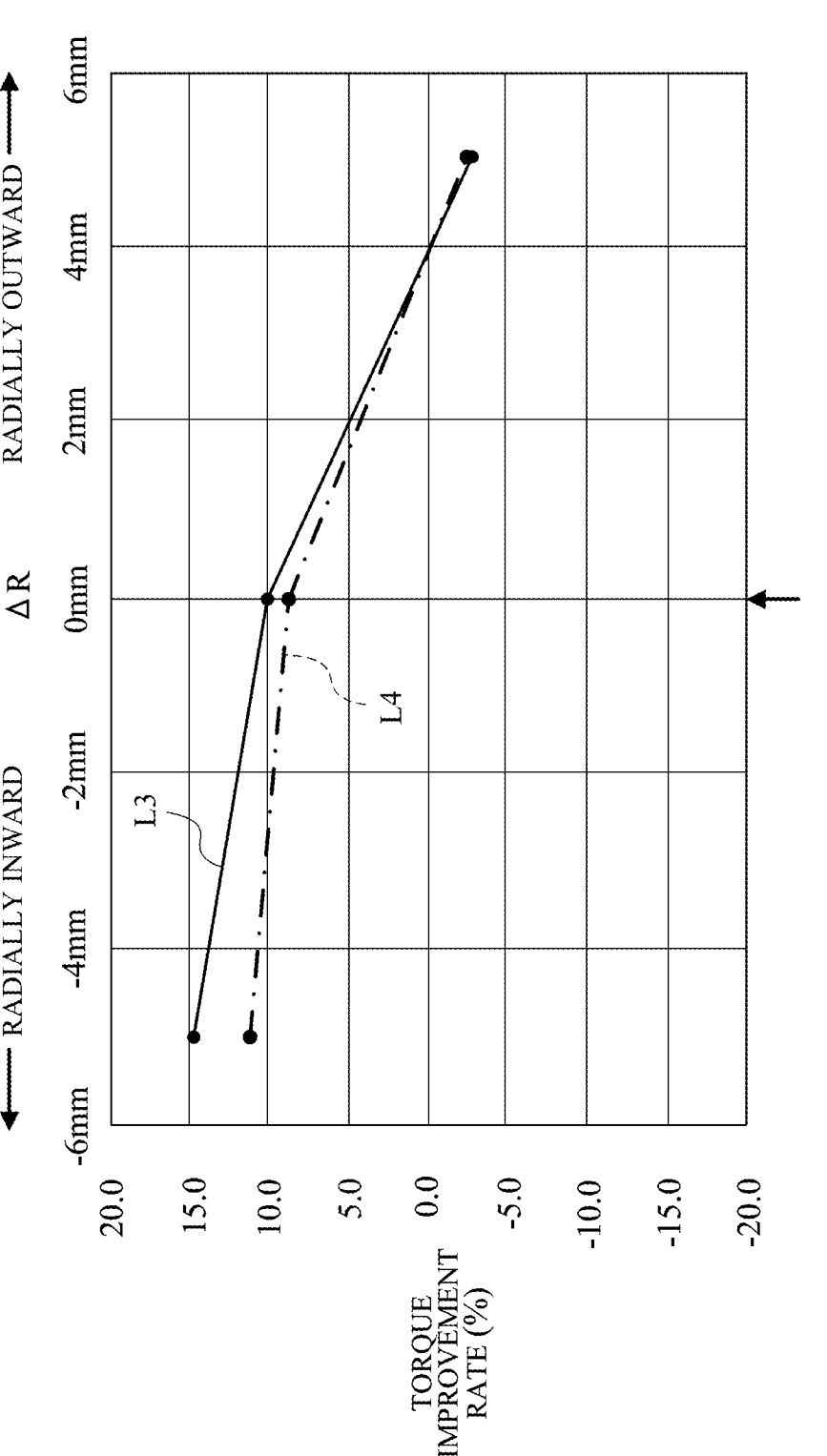
FIG. 25 is a diagram showing a relationship between a position of a region where the cooling medium flow paths communicate with each other and a torque improvement rate in the second embodiment.

FIG. 25, similar to FIG. 16, shows the relationship between the position of the region E1 and the torque improvement rate. In FIG. 25, the torque improvement rate is shown using torque for ΔR=0 in the comparative example (without cooling medium flow path) as a reference (0%). In FIG. 25, the characteristic L3 shown by the solid line indicates the torque improvement rate when using the core blocks 200G and 200H of FIGS. 22 and 23. The characteristic L4 shown by the dashed line indicates the torque improvement rate when the cooling medium flow path 203 and the cooling medium flow path 205 are alternately arranged in the circumferential direction at every predetermined angle θ, as in the core block 200K of FIG. 26.

Figure 26:
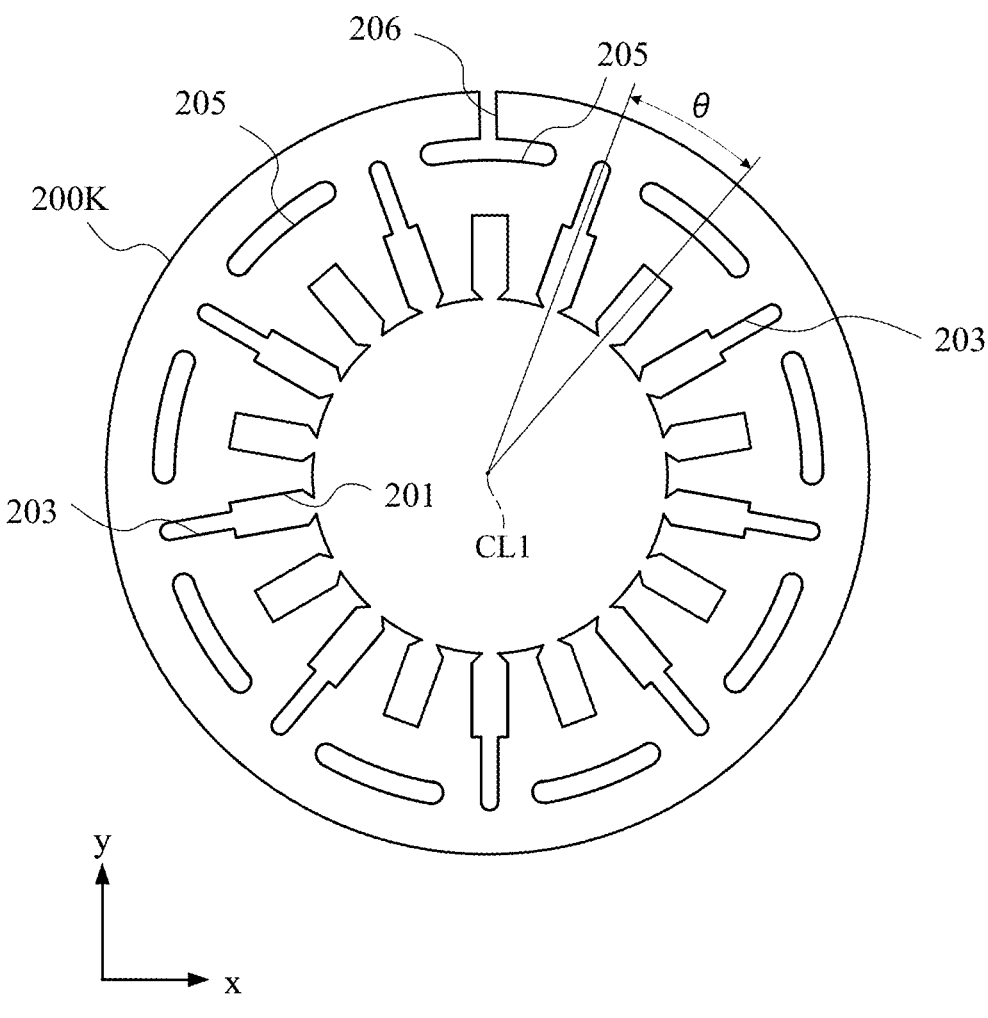
FIG. 26 is a diagram showing a modified example of FIG. 22.
Figure 27:
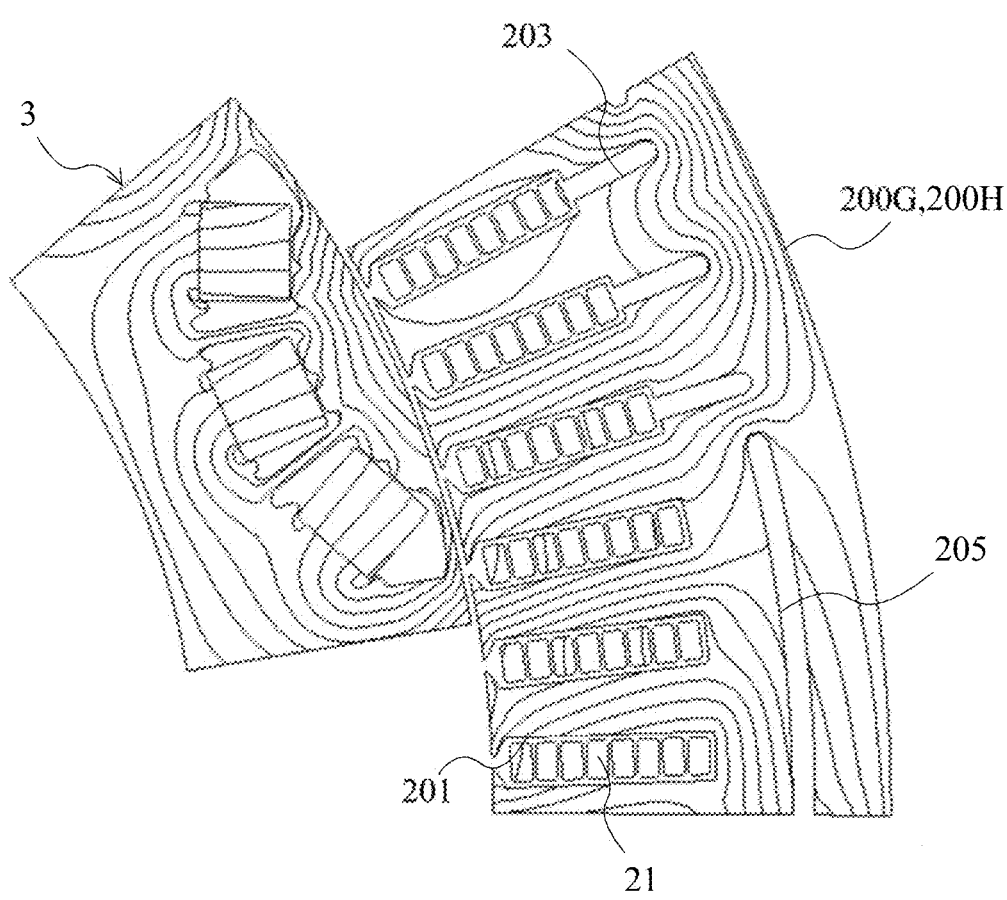
FIG. 27 is a diagram showing the distribution of magnetic flux density for the core blocks of FIGS. 22 and 23.
Figure 28:
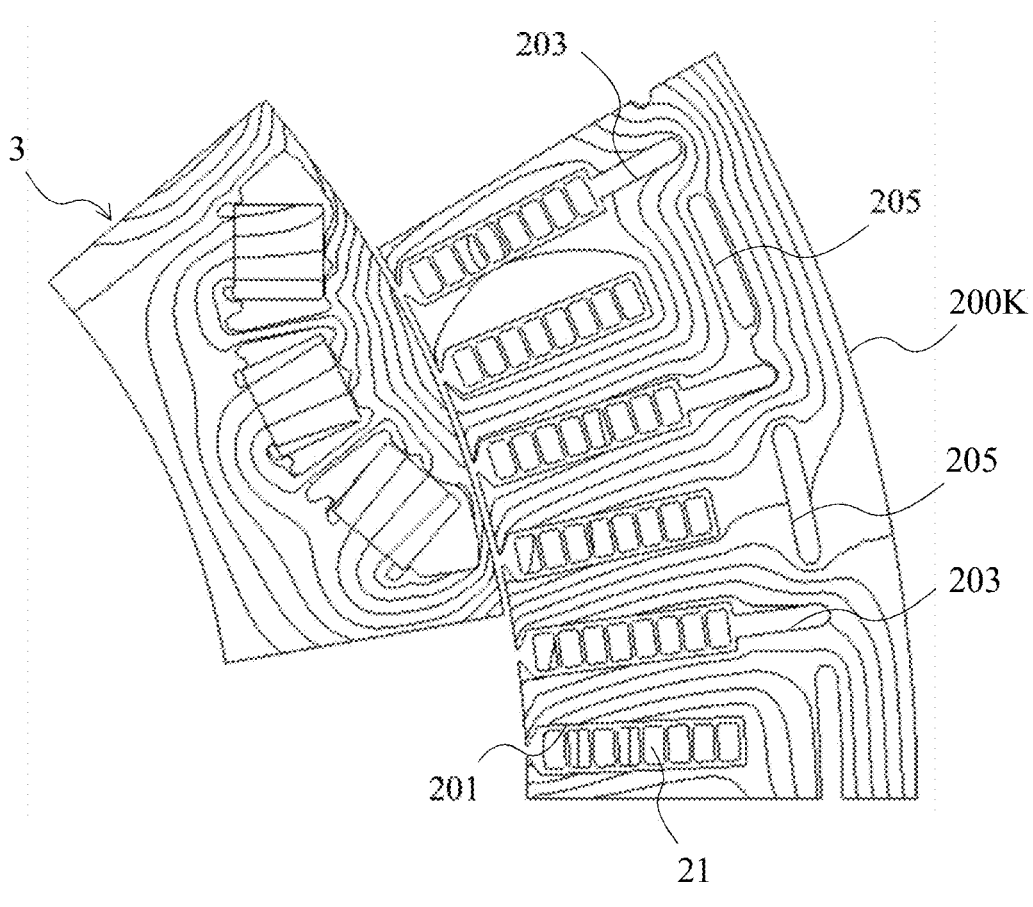
FIG. 28 is a diagram showing the distribution of magnetic flux density for the core block of FIG. 26.

FIG. 27 shows the distribution of magnetic flux density when the core blocks 200G and 200H of FIGS. 22 and 23 are used. FIG. 28 shows the distribution of magnetic flux density when the core block 200K of FIG. 26 is used. As shown in FIGS. 27 and 28, a relatively good distribution of magnetic flux density is obtained by alternately arranging the cooling medium flow paths 203 and the cooling medium flow path 205 in the circumferential direction. As a result, the torque improvement rate becomes greater compared to that of the comparative example, as shown in FIG. 25.

In the configuration where the cooling medium flow paths 202 and 203 extending radially, as in the first embodiment (for example, FIGS. 8 and 9), are alternately arranged in the circumferential direction, as shown in FIG. 16, the torque improvement rate is maximized when the position where the cooling medium flow path 202 and the cooling medium flow path 203 are connected is at the radial center position (ΔR=0) of the back yoke. On the other hand, in the configuration like the second embodiment, where the cooling medium flow path 205 extending in the circumferential direction and the cooling medium flow paths 203 extending in the radial direction are alternately arranged in the circumferential direction, as shown in FIG. 25, the closer the position where the cooling medium flow path 203 and the cooling medium flow path 205 are connected is to the radially inner end of the back yoke, the greater the torque improvement rate. Considering the characteristics L3 and L4 in FIG. 25, it is preferable to set the position (region E1) where the cooling medium flow path 203 and the cooling medium flow path 205 are connected to be radially inside the radial center of the back yoke.

Figure 29:
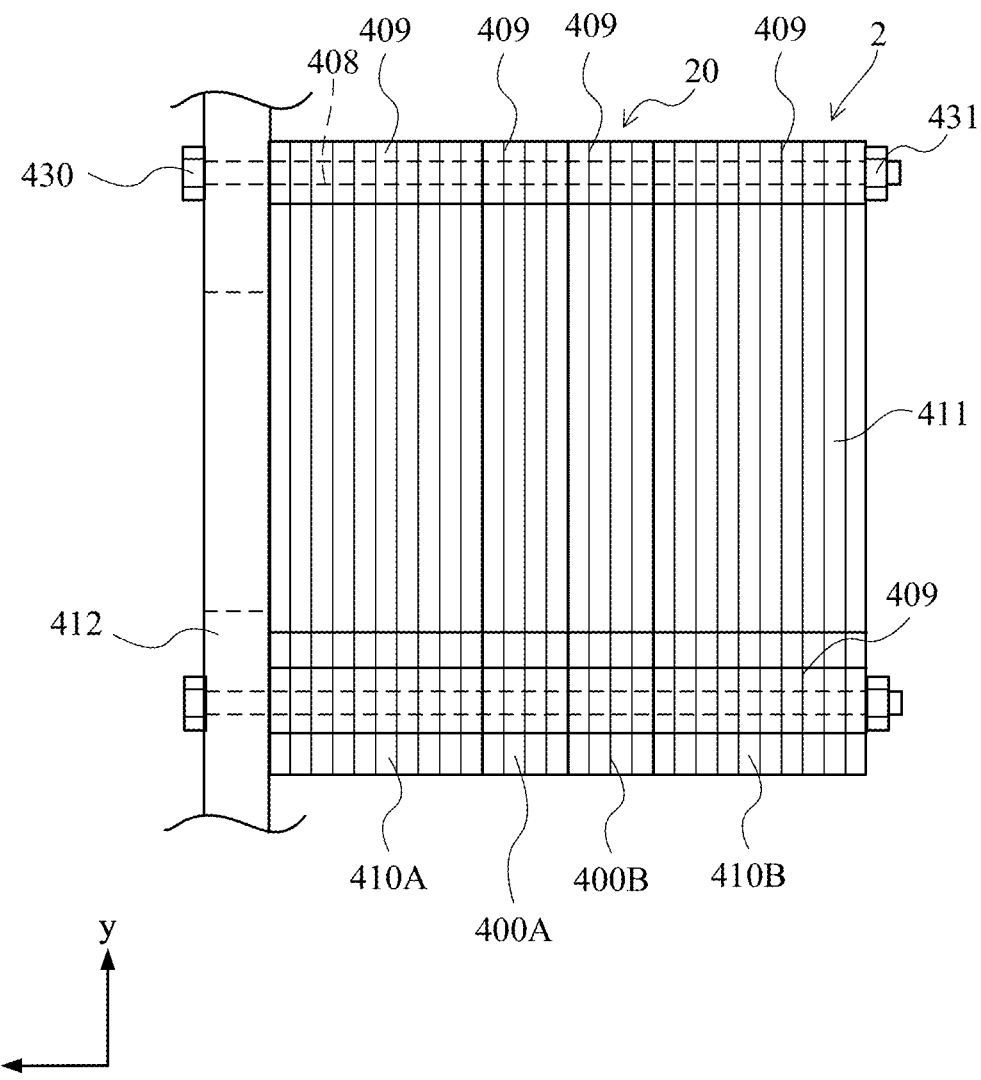
FIG. 29 is a diagram showing a fixing method for a stator different from that of FIGS. 1 and 2.

In the above, although the stator 2 is fixed to the inner peripheral portion of the case 4 as shown in FIGS. 1 and 2, the method of fixing the stator 2 is not limited to this. FIG. 29 is a diagram showing another fixing method for the stator 2. As shown in FIG. 29, the stator core 20 is configured by stacking core blocks 400A and 400B corresponding to the core blocks 200A and 200B in FIG. 2, and core blocks 410A and 410B corresponding to the pair of core blocks 210 and 210 in FIG. 2.

The core blocks 410A, 400A, 400B and 410B have fastening portions 409 protruding radially outward from the outer peripheral surfaces 411 of the core blocks 410A, 400A, 400B and 410B. In the fastening portion 409, through holes 408 penetrating the core blocks 410A, 400A, 400B and 410B in the axial direction are formed. A bolt 430 is inserted into each of the through holes 408 of the core blocks 410A, 400A, 400B and 410B, and by screwing a nut 431 onto the bolt 430, the stator 2 is fixed to the stator fixing portion 412 of the case 4.

Figure 30:
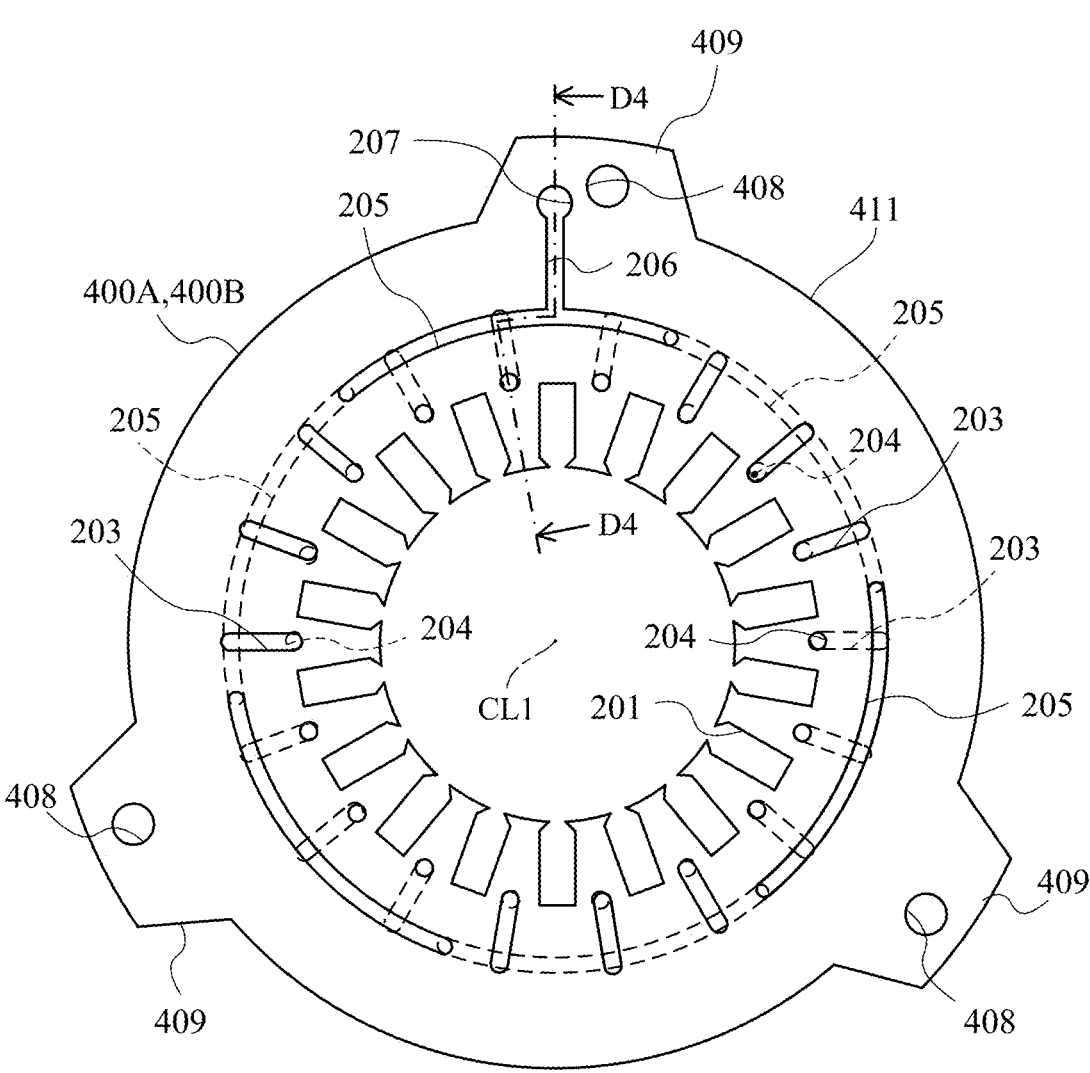
FIG. 30 is a front view of a stacked body of a pair of core blocks in FIG. 29.
Figure 30:
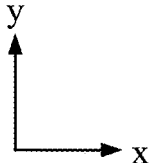
Figure 31:
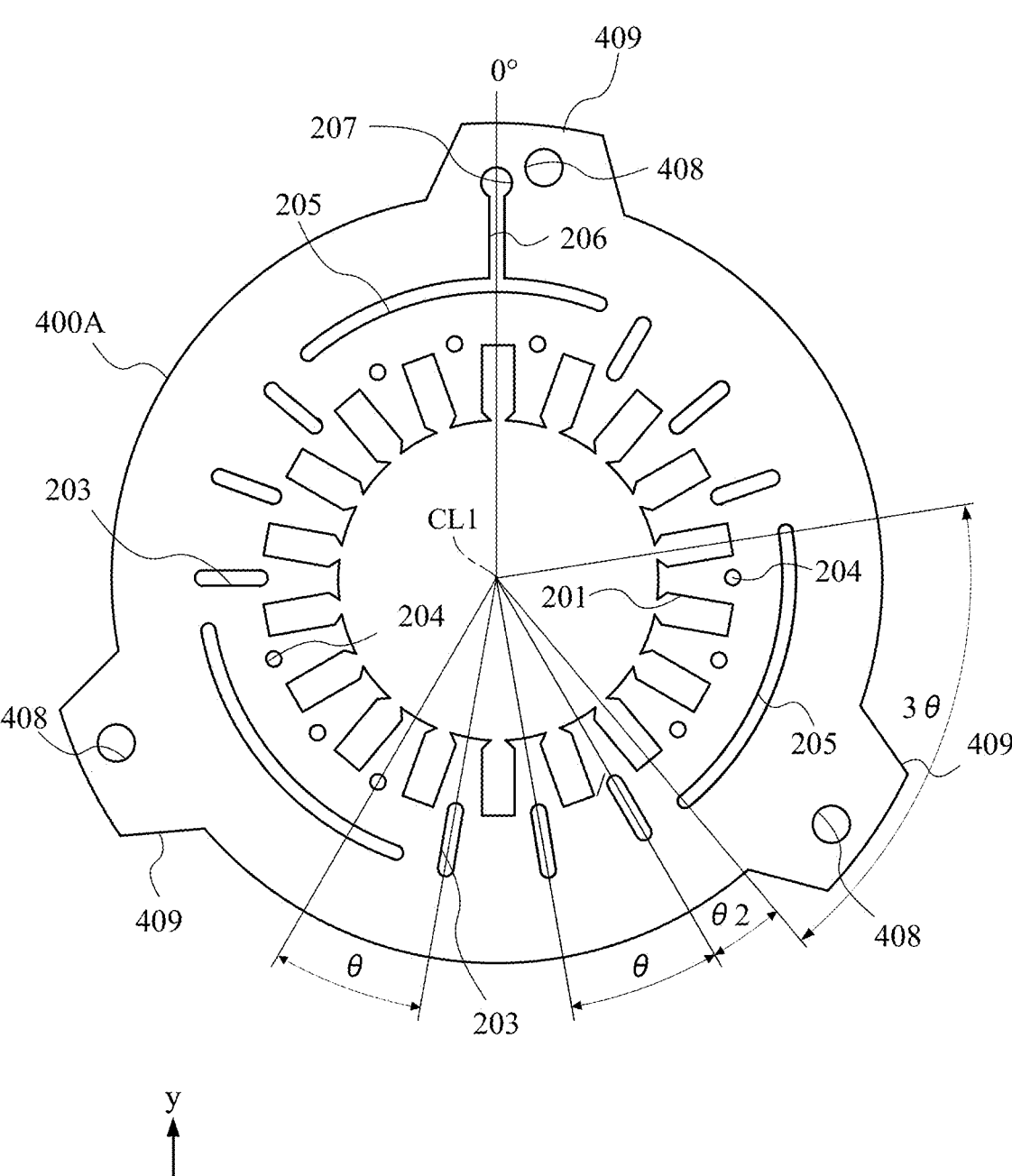
FIG. 31 is a front view of one core block in FIG. 30.
Figure 32:
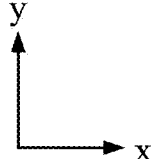
FIG. 32 is a front view of the other core block in FIG. 30.
Figure 33:
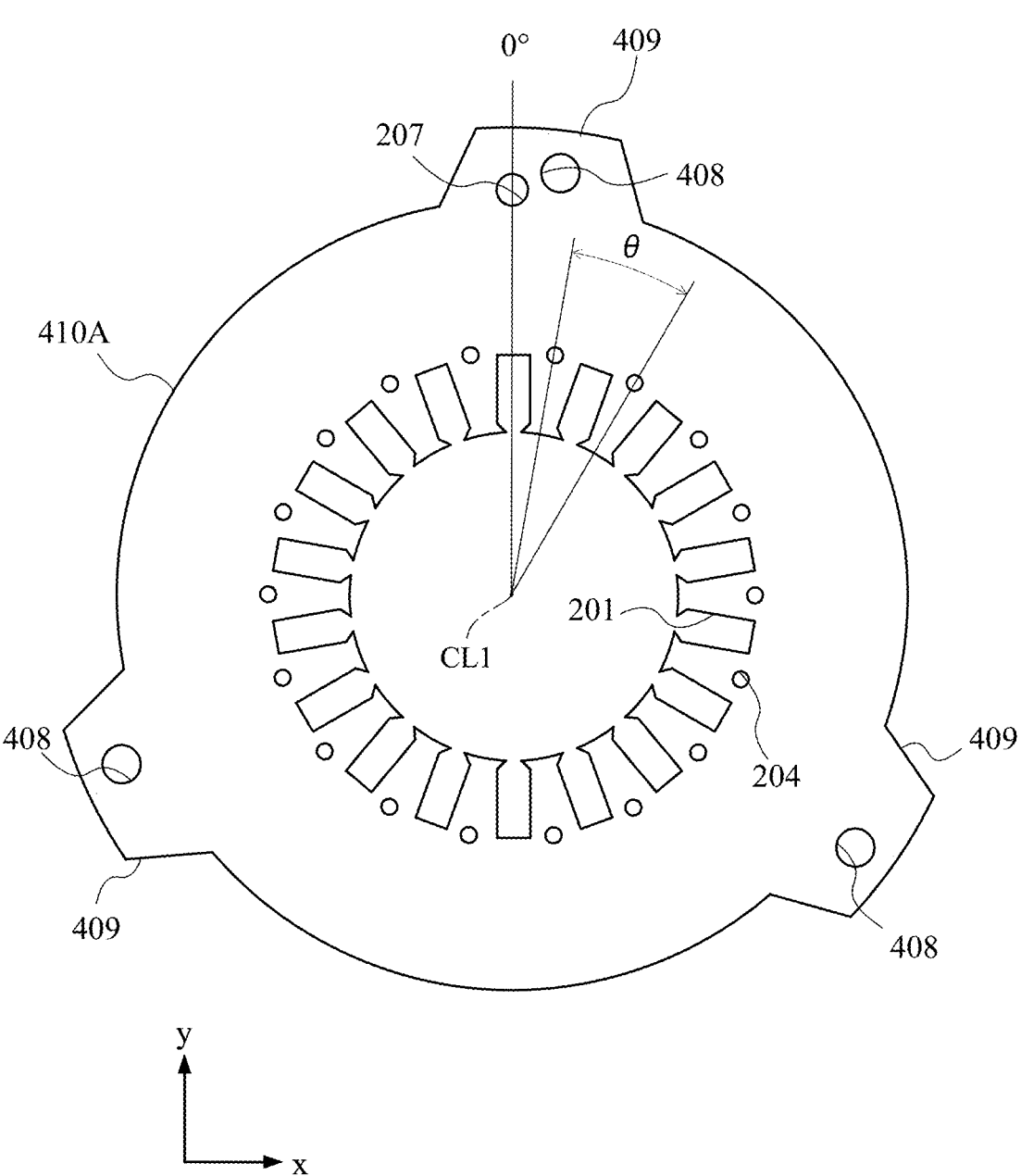
FIG. 33 is a front view of a core block disposed at an end in the axial direction of a stator core in FIG. 29.

FIG. 30 is a front view of the stacked body of the core blocks 400A and 400B. FIG. 31 is a front view of the core block 400A. FIG. 32 is a front view of the core block 400B. FIG. 33 is a front view of the core block 410A. As shown in FIG. 31, cooling medium flow paths 203, 204, 205 and 206 similar to core block 200E in FIG. 18 are provided in the core block 400A. Furthermore, three fastening portions 209 protruding radially outward are provided at every 120° on core block 400A. The through hole 408 is provided in each of the fastening portions 409. A through hole 207 for supplying cooling medium is provided in single fastening portion 409, and the cooling medium inlet path 206 communicates with the through hole 207.

As shown in FIG. 32, the cooling medium flow paths 203, 204 and 205 are provided in the core block 400B, similar to the core block 200F in FIG. 19. As shown in FIG. 30, the core block 400B is rotated by predetermined angle 3θ around the axial line CL1 relative to the core block 400A and stacked. When the core blocks 400A and 400B are stacked, the end portion in the circumferential direction of the cooling medium flow path 205 of the core block 400A overlaps with the end portion in the circumferential direction of the cooling medium flow path 205 of the core block 400B. As a result, the cooling medium flow path 205 of the core block 400A communicates with the cooling medium flow path 205 of the core block 400B, and a substantially annular flow path as a whole is formed in the core blocks 400A and 400B.

Furthermore, the cooling medium flow path 205 of the core block 400A faces the outer end portion in the radial direction of the cooling medium flow path 203 of the core block 400B, and the inner end portion in the radial direction of the cooling medium flow path 203 of the core block 400B faces the cooling medium flow path 204 of the core block 400A. The cooling medium flow path 205 of the core block 400B faces the outer end portion in the radial direction of the cooling medium flow path 203 of the core block 400A, and the inner end portion in the radial direction of the cooling medium flow path 203 of the core block 400A faces the cooling medium flow path 204 of the core block 400B.

As shown in FIG. 33, the cooling medium flow paths 204 are provided in the core block 410A, similar to the core block 210 in FIG. 6. The through hole 408 is provided in each of the fastening portions 409, and a through hole 207 for supplying cooling medium is provided in single fastening portion 409. Although not shown, the through hole 207 is not provided in the core block 410B, and except for this point, the core block 410B is configured identically to the core block 410A.

Figure 34:
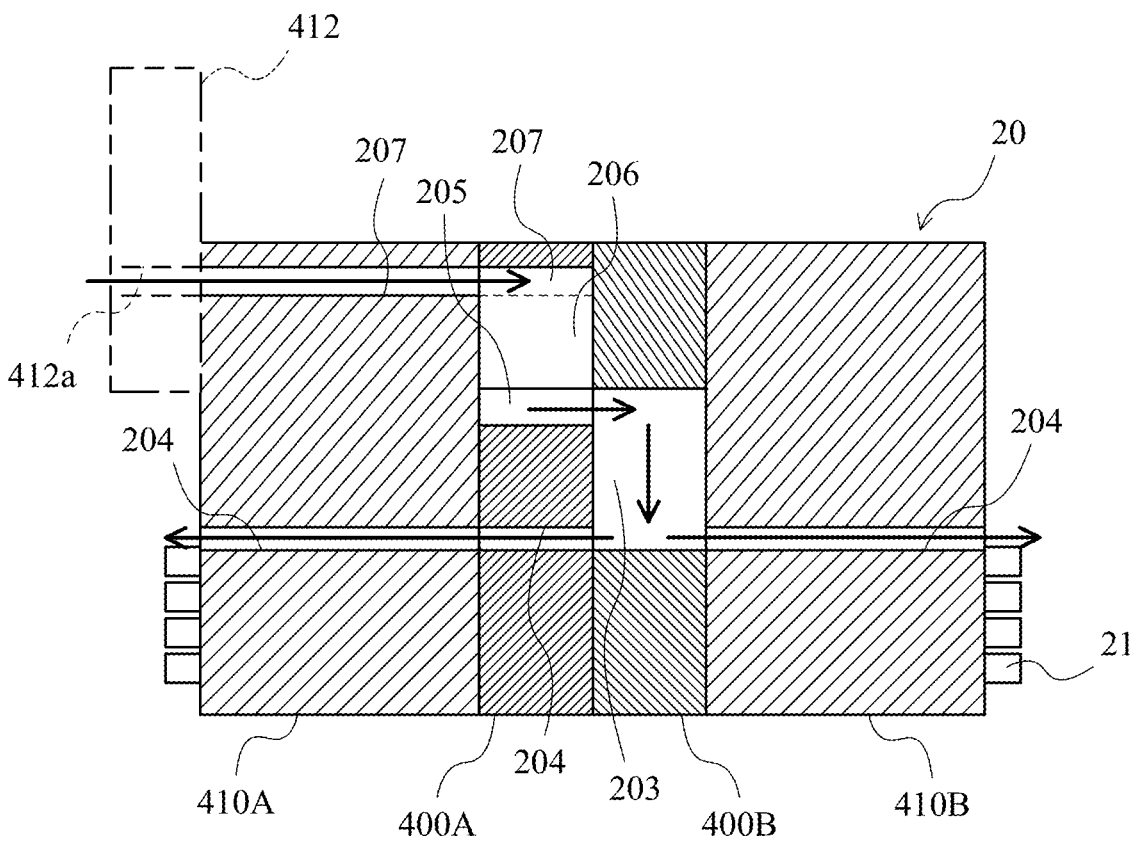
FIG. 34 is a cross sectional view of the stator core along line D4-D4 in FIG. 30.

FIG. 34 is a cross sectional view of the stator core 20 along the line D4-D4 in FIG. 30. FIG. 34 shows the core blocks 410A and 410B and the stator coil 21, in addition to the core blocks 400A and 400B. As shown in FIG. 34, a cooling medium inlet hole 412a for introducing cooling medium from the outside is provided in the stator fixing portion 412 of the case 4 at a position facing the through hole 207 of the core block 410A.

The cooling medium supplied from the outside through the cooling medium inlet hole 412a flows into the through hole 207 of the core block 400A through the through hole 207 of the core block 410A, as indicated by the arrow in FIG. 34. The cooling medium that has flowed into the through hole 207 of the core block 400A flows into the cooling medium flow path 205 through the cooling medium inlet path 206. The cooling medium in the cooling medium flow path 205 flows into the cooling medium flow path 203 of the core block 400B.

The inner end portion in the radial direction of the cooling medium flow path 203 of the core block 400B faces the cooling medium flow path 204 of the core block 400A and the cooling medium flow path 204 of the core block 410B adjacent to the core block 400B. Therefore, the cooling medium in the cooling medium flow path 203 of the core block 400B flows axially along the cooling medium flow path 204 of the core block 410B, flows out from the end face of the core block 410B, and flows towards the coil end. Furthermore, the cooling medium that has flowed from the cooling medium flow path 203 of the core block 400B to the cooling medium flow path 204 of the core block 400A flows axially along the cooling medium flow paths 204 of the core blocks 400A and 410A, flows out from the end face of the core block 410A, and flows towards the coil end.

Thus, the stator core 20 can be configured by fixing the fastening portions 409 protruded from the outer peripheral surfaces of the core blocks 410A, 400A, 400B and 410B to the stator fixing portion 412. In this case as well, similar to the second embodiment, by alternately providing the circumferentially extending cooling medium flow paths and the radially extending cooling medium flow paths, each over predetermined angle 3θ in the circumferential direction, it is possible to improve cooling performance while suppressing the reduction in torque caused by the provision of the cooling medium flow paths.

Furthermore, in the configuration of FIG. 29, it is possible to supply cooling medium to the stator core 20 using the cooling medium inlet hole 412a of the stator fixing portion 412. In this case, since the through hole 207 for supplying cooling medium is provided near the through hole 408, it is possible to improve the sealing performance when fastening the stator core 20 to the case 4 with a bolt. Also, it is possible to effectively suppress the reduction in torque caused by the provision of the through hole 207.

According to the present embodiment, the following operations and effects are achievable.

(1) The rotating electric machine 1 includes a rotor 3 and a stator 2 provided with multiple slots 201 in the circumferential direction (FIG. 1). The stator 2 includes a stator core 20 having the core blocks 200A and 200B or the core blocks 200E and 200F arranged adjacent to each other in the axial direction, and coils 21 arranged in the multiple slots 201 (FIG. 7 or 20). In each of the core blocks 200A and 200B or the core blocks 200E and 200F, multiple cooling medium flow paths 202 and multiple cooling medium flow paths 203 or multiple cooling medium flow paths 203 and multiple cooling medium flow paths 205, which penetrate each of the core blocks 200A and 200B or the core blocks 200E and 200F in the axial direction, are arranged alternately at every predetermined angle θ or every predetermined angle 3θ in the circumferential direction (FIG. 3 or 17). The core blocks 200A and 200B are stacked so that multiple cooling medium flow paths 202 of the core block 200A communicate with multiple cooling medium flow paths 203 of the core block 200B, and multiple cooling medium flow paths 203 of the core block 200A communicate with multiple cooling medium flow paths 202 of the core block 200B (FIG. 3). The core blocks 200E and 200F are arranged so that multiple cooling medium flow paths 203 of the core block 200E communicate with multiple cooling medium flow paths 205 of the core block 200F, and multiple cooling medium flow paths 205 of the core block 200E communicate with multiple cooling medium flow paths 203 of the core block 200F (FIG. 17).

By providing the cooling medium flow paths 202 and 203 or the cooling medium flow paths 203 and 205 inside the core blocks 200A and 200B or the core blocks 200E and 200F in this way, cooling medium can flow inside the core blocks, allowing for efficient cooling of the core blocks. Thus, the stator coils 21 arranged in the slots 201 of the stator core 20 can be effectively cooled.

(2) The cooling medium flow path 202 (a first flow path) extends radially from the outer peripheral surface 211 of each of the core block 200A (a first core block) and the core block 200B (a second core block) to an annular region E1 (a predetermined annular region), which extends circumferentially on the radially inner side of the outer peripheral surface 211 and on the radially outer side of slot 201 (FIG. 4). The cooling medium flow path 203 (a second flow path) extends radially from the annular region E1 to a region near the slot 201 (FIG. 4). Thus, in each of the core blocks 200A and 200B, multiple cooling medium flow paths 202 and multiple cooling medium flow paths 203 extending radially are alternately arranged in the circumferential direction at every predetermined angle θ. The multiple cooling medium flow paths 202 extend from the outer peripheral surface of the back yoke to the region E1, and the multiple cooling medium flow paths 203 extend from the region E1 to a region E2 near the slot 201. This allows for an improvement in cooling efficiency while suppressing the reduction in torque caused by the provision of the cooling medium flow paths.

(3) The annular region E1 is located at an approximately middle in the radial direction between the outer peripheral surface 211 of each of the core blocks 200A and 200B and the outer end portion in the radial direction of the slot 201 (FIG. 4). As a result, as shown in FIG. 16, the torque improvement rate can be maximized, and the degree of torque reduction caused by the provision of the cooling medium flow paths can be minimized.

(4) The cooling medium flow path 205 (a first flow path) extends in the circumferential direction in a annular region E1 (a predetermined annular region), which extends in the circumferential direction inside the outer peripheral surface 211 of each of the core blocks 200E (a first core block) and 200F (a second core block) and outside the slot 201 in the radial direction (FIG. 18). The cooling medium flow path 203 (a second flow path) extends radially from the annular region E1 to the area near the slot 201 (FIG. 18). In the core block 200E, a cooling medium inlet path 206 (a cooling medium supply portion) is provided, which extends radially from the outer peripheral surface 211 of the core block 200E to the cooling medium flow path 205 (FIG. 18). By alternately arranging the cooling medium flow path 205, which extends in the circumferential direction, and the cooling medium flow path 203, which is provided inside the cooling medium flow path 205 in the radial direction and extends in the radial direction, at every predetermined angle 3θ in the circumferential direction, it is possible to improve cooling efficiency while suppressing the decrease in torque.

(5) The annular region E1 is located radially inward of the middle in the radial direction between the outer peripheral surface 211 of each of the core blocks 200E and 200F and the outer end portion in the radial direction of the slot 201 (FIG. 18). Therefore, it possible to increase a torque improvement rate as shown in FIG. 25, and reduce the extent of torque reduction caused by the provision of the cooling medium flow path.

(6) In each of the core blocks 200A and 200B, or the core blocks 200E and 200F, multiple cooling medium flow paths 204 (a third flow path) that penetrate the core block in the axial direction are further provided in the circumferential direction in the annular region E2 near the slot 201 (FIG. 3 or 17). The cooling medium flow path 204 of the core block 200A or 200E communicates with the inner end portion in the radial direction of the cooling medium flow path 203 of the core block 200B or 200F (FIG. 3 or 17). The cooling medium flow path 204 of the core blocks 200B or 200F communicates with the inner end portion in the radial direction of the cooling medium flow path 203 of the core block 200A or 200E (FIG. 3 or 17). By providing the cooling medium flow path 204 near the slot 201 in this manner, the cooling efficiency of the stator coil 21 inside the slot 201 can be improved by the cooling medium flowing through the cooling medium flow path 204.

(7) The stator core 20 further includes a pair of core blocks 210 and 210 (a third core block) that are arranged adjacent to each of the core blocks 200A and 200B or 200E and 200F in the axial direction, in (FIG. 7 or 20). In the pair of core blocks 210 and 210, multiple cooling medium flow paths 204 (a fourth flow path) which penetrate the pair of core blocks 210 and 210 in the axial direction are provided, so as to communicate with the inner end portion in the radial direction of the cooling medium flow path 203 of the core block 200A or 200F, and communicate with the cooling medium flow path 204 of the core block 200B or 200E (FIG. 7 or 20). By providing the cooling medium flow paths 204 in the pair of core blocks 210 and 210 in this manner, it is possible to further suppress the decrease in torque.

(8) The cooling medium flow path 203 extends further from the region E2 near the slot to the slot 201 (FIGS. 8 and 21). As a result, since the cooling medium flows into the slot 201 from the cooling medium flow path 203, the stator coil 21 can be directly cooled by the cooling medium, improving the cooling efficiency of the stator coil 21.

(9) The multiple slots 201 are arranged at every predetermined angle θ in the circumferential direction (FIG. 18). In a case that multiple cooling medium flow paths 203 and multiple cooling medium flow paths 205 are arranged at every a predetermined angle, when using an integer N greater than or equal to 2, the predetermined angle is N times θ (3θ), and N (three) number of cooling medium flow paths 203 are arranged at every predetermined angle θ between the pair of cooling medium flow paths 205 and 205 adjacent to each other in the circumferential direction (FIG. 18). Thus, all cooling medium flow paths 203 can be communicated with the cooling medium flow path 205 in a single repositioning of the core block.

(10) The stator core 20 has multiple fastening portions 409 in the circumferential direction, which protrude radially outward from the outer peripheral surface 211 of the stator core 20, and a through holes 408 (through which a bolt passes) is formed in the multiple fastening portions 409 (FIG. 30). In at least one of the multiple circumferential fastening portions 409, a through hole 207 (cooling medium inlet hole) for supplying cooling medium, which introduces cooling medium from the outside and communicates with the cooling medium flow path 205, is formed near the through hole 408 (FIG. 30). By placing the through hole 207 for cooling medium supply near the through hole 408 in this manner, it is possible to suppress the reduction in torque caused by the provision of the through hole 207, and since the fastening force of the bolt acts axially through the through hole 408 on the fastening portion 409, the sealing performance is improved.

The above embodiment can be combined as desired with one or more of the above modifications. The modifications can also be combined with one another.

According to the present invention, it is possible to improve cooling performance of a coil.

Above, while the present invention has been described with reference to the preferred embodiments thereof, it will be understood, by those skilled in the art, that various changes and modifications may be made thereto without departing from the scope of the appended claims.

What is claimed is:

1. A rotating electric machine comprising:

a rotor; and a stator provided with a plurality of slots in a circumferential direction, wherein the stator includes a stator core having a first core block and a second core block arranged adjacent to each other in an axial direction, and a coil disposed in the plurality of slots, each of the first core block and the second core block is configured so that a plurality of first flow paths and a plurality of second flow paths penetrating the each of the first core block and the second core block in an axial direction are arranged in the circumferential direction, each of the plurality of first flow paths and each of the plurality of second flow paths are arranged alternately at every a predetermined angle in the circumferential direction, and the first core block and the second core block are arranged so that the plurality of first flow paths of the first core block and the plurality of second flow paths of the second core block communicate with each other and the plurality of second flow paths of the first core block and the plurality of first flow paths of the second core block communicate with each other.

2. The rotating electric machine according to claim 1, wherein the plurality of first flow paths are provided so as to extend in a radial direction from an outer peripheral surface of each of the first core block and the second core block to a predetermined annular region extending in the circumferential direction inside the outer peripheral surface in the radial direction and outside the plurality of slots in the radial direction, and the plurality of second flow paths are provided so as to extend in the radial direction from the predetermined annular region to a region near the plurality of slots.

3. The rotating electric machine according to claim 2, wherein the predetermined annular region is located at a middle between outer end portions in the radial direction of the plurality of slots and the outer peripheral surface.

4. The rotating electric machine according to claim 2, wherein the each of the first core block and the second core block is configured so that a plurality of third flow paths penetrating the each of the first core block and the second core block in the axial direction are provided in a region near the plurality of slots, and the first core block and the second core block are arranged so that the plurality of third flow paths of the first core block communicate with inner end portions in the radial direction of the plurality of second flow paths of the second core block and the plurality of third flow paths of the second core block communicate with inner end portions in the radial direction of the plurality of second flow paths of the first core block.

5. The rotating electric machine according to claim 4, wherein the stator core further includes a pair of third core blocks arranged adjacent to the first core block and the second core block in the axial direction, each of the pair of third blocks is configured so that a plurality of fourth flow paths penetrating the each of the pair of third core blocks in the axial direction are provided in the circumferential direction, and the pair of third blocks are arranged so that the plurality of fourth flow paths of one of the pair of third blocks communicate with the inner end portions in the radial direction of the plurality of second flow paths of the first core block and the plurality of fourth flow paths of another of the pair of third blocks communicate with the plurality of third flow paths of the second core block.

6. The rotating electric machine according to claim 2, wherein the plurality of second flow paths are further extended from the region near the plurality of slots to the plurality of slots.

7. The rotating electric machine according to claim 1, wherein the plurality of first flow paths are provided so as to extend in the circumferential direction in a predetermined annular region extending in the circumferential direction inside an outer peripheral surface of each of the first core block and the second core block in a radial direction and outside the plurality of slots in the radial direction, the plurality of second flow paths are provided so as to extend in the radial direction from the predetermined annular region to a region near the plurality of slots, and the first core block is provided with a cooling medium supply portion extended in the radial direction from the outer peripheral surface of the first core block to one of the plurality of first flow paths of the first core block.

8. The rotating electric machine according to claim 7, wherein the predetermined annular region is located radially inward of a middle between outer end portions in the radial direction of the plurality of slots and the outer peripheral surface.

9. The rotating electric machine according to claim 7, wherein the each of the first core block and the second core block is configured so that a plurality of third flow paths penetrating the each of the first core block and the second core block in the axial direction are provided in a region near the plurality of slots, and the first core block and the second core block are arranged so that the plurality of third flow paths of the first core block communicate with inner end portions in the radial direction of the plurality of second flow paths of the second core block and the plurality of third flow paths of the second core block communicate with inner end portions in the radial direction of the plurality of second flow paths of the first core block.

10. The rotating electric machine according to claim 9, wherein the stator core further includes a pair of third core blocks arranged adjacent to the first core block and the second core block in the axial direction, each of the pair of third blocks is configured so that a plurality of fourth flow paths penetrating the each of the pair of third core blocks in the axial direction are provided in the circumferential direction, and the pair of third blocks are arranged so that the plurality of fourth flow paths of one of the pair of third blocks communicate with the inner end portions in the radial direction of the plurality of second flow paths of the first core block and the plurality of fourth flow paths of another of the pair of third blocks communicate with the plurality of third flow paths of the second core block.

11. The rotating electric machine according to claim 7, wherein the plurality of second flow paths are further extended from the region near the plurality of slots to the plurality of slots.

12. The rotating electric machine according to claim 7, wherein the predetermined angle is a first angle, the plurality of slots are arranged at every a second angle in the circumferential direction, the first angle is N times the second angle when N is defined as an integer greater than or equal to two, the plurality of first flow paths include a pair of first flow paths arranged adjacent to each other in the circumferential direction, and the N number of flow paths included in the plurality of second flow paths are arranged at every the second angle between the pair of first flow paths.

13. The rotating electric machine according to claim 7, wherein the stator core further includes a plurality of fastening portions in the circumferential direction protruded radially outward from the outer peripheral surface, a through hole through which a bolt passes is provided in each of the plurality of fastening portions, a cooling medium supply hole is provided near the through hole of at least one of the plurality of fastening portions so that the cooling medium supply hole communicates with the one of the plurality of first flow paths so as to supply the cooling medium from an outside.

14. The rotating electric machine according to claim 1, wherein each of the first core block and the second core block includes a plurality of magnetic steel sheets stacked.

\* \* \* \* \*